US008837001B2

(12) United States Patent
Tanaka et al.

(10) Patent No.: US 8,837,001 B2
(45) Date of Patent: Sep. 16, 2014

(54) IMAGE FORMING APPARATUS AND GRADATION CORRECTION METHOD FOR THE SAME

(71) Applicants: Hideaki Tanaka, Tokyo (JP); Takashi Harashima, Tokyo (JP); Katsuyuki Hirata, Tokyo (JP); Daiki Yamanaka, Tokyo (JP); Kazuhiro Saito, Tokyo (JP)

(72) Inventors: Hideaki Tanaka, Tokyo (JP); Takashi Harashima, Tokyo (JP); Katsuyuki Hirata, Tokyo (JP); Daiki Yamanaka, Tokyo (JP); Kazuhiro Saito, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 21 days.

(21) Appl. No.: 13/705,675

(22) Filed: Dec. 5, 2012

(65) Prior Publication Data

US 2013/0148138 A1    Jun. 13, 2013

(30) Foreign Application Priority Data

Dec. 7, 2011  (JP) ................................. 2011-268004
Dec. 13, 2011  (JP) ................................. 2011-272239

(51) Int. Cl.
*H04N 1/405* (2006.01)
*H04N 1/00* (2006.01)
*H04N 1/60* (2006.01)
*H04N 1/407* (2006.01)
*H04N 1/04* (2006.01)

(52) U.S. Cl.
CPC ............ *H04N 1/60* (2013.01); *H04N 1/00063* (2013.01); *H04N 2201/0082* (2013.01); *H04N 1/00015* (2013.01); *H04N 1/4078* (2013.01); *H04N 1/00023* (2013.01); *H04N 1/00034* (2013.01); *H04N 1/04* (2013.01); *H04N 1/00045* (2013.01); *H04N 1/00087* (2013.01)
USPC ......................................... 358/3.21; 358/406

(58) Field of Classification Search
CPC .......... G03G 15/5058; G03G 15/5054; G03G 2215/00059; G03G 2215/00042; G03G 2215/00063; H04N 1/04; H04N 1/6033; H04N 1/4078; H04N 1/00068; H04N 1/00087
USPC ............... 358/1.9, 1.12, 519, 521, 1.13, 3.21, 358/406, 504, 518; 399/49, 72
See application file for complete search history.

(56) References Cited

U.S. PATENT DOCUMENTS 6,516,163 B2 * 2/2003 Nakai et al. ..................... 399/49
6,775,489 B2 * 8/2004 Tsuruya et al. .................. 399/49

(Continued)

FOREIGN PATENT DOCUMENTS

JP       2001-260407       9/2001
JP       2005-024733       1/2005

(Continued)

OTHER PUBLICATIONS

Japanese Office Action, Notice of Reasons for Rejection, Japanese Patent Application No. 2011-268004, Dispatch Date: Oct. 29, 2013 (2 pages).

(Continued)

*Primary Examiner* — Thomas D Lee
*Assistant Examiner* — Stephen M Brinich
(74) *Attorney, Agent, or Firm* — Lucas & Mercanti, LLP

(57) ABSTRACT

An image forming apparatus and a gradation correction method for the same are provided. An image forming apparatus includes an image forming section that forms a plurality of patch bands in a plurality of positions in a main scanning direction on an image bearing member, each of the plurality of patch bands having a plurality of gradation patches disposed in a sub-scanning direction; a density detection section that detects densities of the plurality of patch bands; and a control section that performs gradation correction based on detection results from the density detection section. The plurality of patch bands differs from each other.

18 Claims, 21 Drawing Sheets

(56) References Cited

U.S. PATENT DOCUMENTS

| | | | |
|---|---|---|---|
| 7,486,900 B2* | 2/2009 | Omata | 399/49 |
| 7,813,659 B2* | 10/2010 | Kawaguchi | 399/39 |
| 7,978,382 B2* | 7/2011 | Ono | 358/504 |
| 8,107,836 B2* | 1/2012 | Nishimura | 399/49 |
| 8,194,299 B2* | 6/2012 | Yamashita et al. | 358/521 |
| 2011/0229171 A1* | 9/2011 | Hirai | 399/49 |

FOREIGN PATENT DOCUMENTS

| | | |
|---|---|---|
| JP | 2006-047203 | 2/2006 |
| JP | 2006-259261 | 9/2006 |
| JP | 2006-343679 | 12/2006 |
| JP | 2007-264371 | 10/2007 |
| JP | 2008-026551 | 2/2008 |
| JP | 2009-219070 | 9/2009 |
| JP | 2010-134366 | 6/2010 |
| JP | 2010-171689 | 8/2010 |
| JP | 2011-064715 | 3/2011 |

OTHER PUBLICATIONS

English translation of Japanese Office Action, Notice of Reasons for Rejection, Japanese Patent Application No. 2011-268004, Dispatch Date: Oct. 29, 2013 (4 pages).

Japanese Office Action, Notice of Reasons for Rejection of JP2011-272239, Drafting date: Jan. 15, 2014. Dispatch Date: Jan. 21, 20014 (5 pages).

English translation of Japanese Office Action, Notice of Reasons for Rejection of JP2011-272239, Drafting date: Jan. 15, 2014. Dispatch Date: Jan. 21, 20014 (5 pages).

* cited by examiner

SUB-SCANNING DIRECTION OF BELT →

IMAGE FORMING APPARATUS AND GRADATION CORRECTION METHOD FOR THE SAME

CROSS REFERENCE TO RELATED APPLICATIONS

This application is entitled to and claims the benefit of Japanese Patent Applications No. 2011-268004, filed on Dec. 7, 2011, and No. 2011-272239, filed on Dec. 13, 2011, the disclosure of which including the specification, drawings and abstract are incorporated herein by reference in their entirety.

BACKGROUND OF THE INVENTION

1. Field of the Invention

The present invention relates to an image forming apparatus such as copiers, printer, facsimiles, and digital multifunction peripherals, and a gradation correction method for the image forming apparatus.

2. Description of Related Art

In general, in an electrophotographic image forming apparatus, a charged photoconductor is so irradiated with laser light based on image data that an electrostatic latent image is formed, and the latent image is developed with a developer containing toner to visualize the latent image, forming a toner image. The toner image is directly or indirectly transferred to a sheet, and a fixing device then heats and pressurizes the sheet to fix the toner image thereto. In this way an image is formed on the sheet.

In such an image forming apparatus, the image density of the toner image varies due for instance to degradation of the photoconductor, the developer, and other image formation-related components over time and to changes in temperature, humidity, and other environmental factors around the apparatus, disadvantageously resulting low quality of an output image formed on the sheet. More specifically, a phenomenon occurs in which the gradation levels of an input image are not reproduced in an output image with high fidelity. In view of the foregoing drawback, in a conventional image forming apparatus, image stabilization control for stabilizing the density of an image, such as gradation correction, is performed so that the gradation levels and other parameters of an input image are stably reproduced in an output image (see, e.g., Japanese Patent Application Laid-Open No. 2006-259261).

In an image forming apparatus, for example, a gradation pattern image (also referred to as a "patch band") formed of a plurality of gradation levels is formed as a test toner image on the photoconductor, and gradation correction is performed based on the densities of the gradation pattern image. This gradation correction is performed to correct image gradation characteristics when turning on power, when returning from sleep, when the print count has reached a predetermined number, or when the external environment has significantly changed.

An example of the image stabilization control is gradation correction (gamma correction) performed by forming CMYK color toner patterns on an intermediate transfer belt, which is an image bearing member, detecting the densities of the toner patterns with an optical sensor, generating gradation correction data based on the detection results (gradation characteristics), and feeding the gradation correction data back to image formation conditions, such as charging potential, developing potential, and the amount of light exposure.

Specifically, when the image forming apparatus performs the gradation correction, a gradation pattern image is formed on the intermediate transfer belt, and the density of each gradation of the gradation pattern image is detected with a density detection sensor. A desired image density is achieved by adjusting a development bias in such a way that the detected densities agree with target densities set in advance (that is, by performing gradation correction). In practice, the gradation correction is performed by correcting input gradation levels of image data based on the densities detected by the density detection sensor in such a way that each gradation agrees with the predetermined density in a gradation conversion table in a control section.

Japanese Patent Application Laid-Open No. 2006-259261 discloses an image forming apparatus that forms a gradation pattern image of each color for gradation correction on an image bearing member based on image data having predetermined gradation levels, measures the densities of the formed color gradation pattern images with a reflective density detection sensor, creates a gamma correction curve based on the measurement results, and regularly updates the gamma correction curve.

In the image stabilization control described above, it is necessary to accurately detect the densities of the gradation pattern images formed on the image bearing member and accurately figure out the current gradation characteristics. However, what is called image unevenness can affect a plurality of gradation patches that form each of the gradation pattern images formed on the image bearing member. The image unevenness used herein is a phenomenon in which fatigue and other types of degradation of a development roller, the photoconductor, a transfer belt, or any other member that forms an image formation section cause the density of an output image output on a sheet to decrease or increase in the moving direction (also referred to as "sub-scanning direction") of the image bearing member. In this case, the image unevenness affects detected densities of the plurality of gradation patches formed on the sheet in the moving direction of the image bearing member. In particular, detected densities of high-density gradation patches are not accurate. The gradation characteristic of the image formation section that has been calculated from the detected densities of the plurality of gradation patches is therefore not accurate, and gradation correction performed based on the resultant gradation characteristic will not provide appropriate image stabilization control.

Further, what is called reflection unevenness may affect the detection of the plurality of gradation patches that form each of the gradation pattern images formed on the image bearing member. The reflection unevenness used herein is a phenomenon in which variation in projections and depressions that occurs in a base surface of the image bearing member along the moving direction of the image bearing member causes the reflectance of the base surface to vary when the base surface is irradiated with laser light for forming an electrostatic latent image. In this case, the reflection unevenness affects detected densities of the plurality of gradation patches formed on a sheet in the moving direction of the image bearing member. In particular, detected densities of low-density gradation patches are not accurate. The gradation characteristic of the image formation section that has been calculated from the detected densities of the plurality of gradation patches is therefore not accurate, and gradation correction performed based on the resultant gradation characteristic will not provide appropriate image stabilization control.

Poor accuracy in the detection of the gradation pattern images lowers the accuracy in the gradation correction accordingly, and a large number of ideas have therefore been put into practice to detect the densities of the gradation pattern images with high accuracy.

Japanese Patent Application Laid-Open Nos. 2010-134366, 2008-26551 and 2006-343679 disclose technology that uses a plurality of gradation pattern images. They also disclose technology in which in order to cancel density unevenness that occurs at the cycle of a developing roller, an intermediate transfer belt, or a photoconductor (i.e., cyclic density unevenness), a plurality of gradation patterns are positioned at an interval of ½ or M/N (where M and N are coprime natural numbers) of the above-described cycles.

Japanese Patent Application Laid-Open Nos. 2010-171689 and 2011-64715 disclose technology for limiting a decrease in accuracy in gradation correction due to density unevenness or lack of density by skillfully arranging gradation pattern images.

In these technologies, to shorten the overall period required to perform gradation correction by shortening the period required to detect the densities of a gradation pattern image, the length of the gradation pattern image may be shortened. Shortening each of the gradation patches that form the gradation pattern image, however, increases the possibility of wrong detection of the densities of the gradation patches, resulting in a decrease in accuracy of gradation correction.

Forming a plurality of gradation pattern images as disclosed in Japanese Patent Application Laid-Open Nos. 2010-134366, 2008-26551, 2006-343679, 2010-171689 and 2011-64715 described above can relatively increase the total length of the gradation patches, which lowers the possibility of wrong detection of the densities of the gradation patches. Depending on the arrangement of the gradation pattern images, however, the period required to detect the densities of the gradation pattern images increases.

FIGS. 1 and 2 show examples of the arrangement of a plurality of gradation pattern images 3-1 and 3-2 formed on intermediate transfer belt 1.

FIG. 1 shows a case where the same gradation pattern images 3-1 and 3-2 are disposed in series with each other along the moving direction of intermediate transfer belt 1. In the case shown in FIG. 1, when intermediate transfer belt 1 moves in the direction indicated by the arrow, density detection sensor 2 fixed to an image forming apparatus measures the densities of gradation pattern images 3-1 and 3-2 from left to right.

FIG. 2 shows an example where the same gradation pattern images 3-1 and 3-2 are disposed in parallel to each other along the moving direction of intermediate transfer belt 1. In the case shown in FIG. 2, when intermediate transfer belt 1 moves in the direction indicated by the arrow, density detection sensors 2-1 and 2-2 fixed to an image forming apparatus measure the densities of gradation pattern images 3-1 and 3-2 from left to right.

In both cases shown in FIGS. 1 and 2, the densities of the gradation patches in the same gradation pattern images 3-1 and 3-2 are averaged, and gradation correction is performed based on the averaged densities. This provides reliable measured densities that are not greatly affected, for example, by density unevenness.

In the arrangement shown in FIG. 1, densities of gradation pattern images 3-1 and 3-2 disposed in series with each other are detected by single density detection sensor 2. This arrangement disadvantageously requires a density detection period longer than the case where densities of gradation patterns 3-1 and 3-2 disposed in parallel to each other are detected by two density detection sensors 2-1 and 2-2 as shown in FIG. 2. In a simple calculation, the arrangement shown in FIG. 1 requires a density detection period twice longer than the arrangement shown in FIG. 2.

In these arrangements, it is assumed that there is scratch 4 that runs along the width direction (also referred to as "main scanning direction") of intermediate transfer belt 1. In this case, the arrangement shown in FIG. 1 provides more correct detected densities than the arrangement shown in FIG. 2. That is, in the arrangement shown in FIG. 1, even when scratch 4 is present in one of the gradation patches that form gradation pattern image 3-1, a detected density of the gradation patch with scratch 4 can be replaced with a detected density of the gradation patch having the same gradation in gradation pattern image 3-2. In contrast, in the arrangement shown in FIG. 2, since scratch 4 is present both in gradation patches having the same gradation level in gradation pattern images 3-1 and 3-2, it is difficult to provide correct detected densities of the gradation patches where scratch 4 is present. That is, in the arrangement shown in FIG. 2, which can lower the degree of an adverse effect of a local scratch, it is difficult to eliminate an adverse effect of scratch 4 or unevenness present across the width of intermediate transfer belt 1.

In addition to scratch 4, intermediate transfer belt 1 has other density affecting factors present along the width of intermediate transfer belt 1, such as curling of the intermediate belt, streaks derived from the photoconductive drum.

Conventionally, sufficient studies have not been conducted on technologies for not only shortening the density detection period but also limiting a decrease in density detection accuracy due to density affecting factors in the direction perpendicular to the direction of arranging gradation pattern images (scratch 4 extending along the width of intermediate transfer belt 1 in FIGS. 1 and 2).

SUMMARY OF THE INVENTION

An object of the present invention is to provide an image forming apparatus and a gradation correction method capable of performing appropriate gradation correction when image unevenness or reflection unevenness occurs in the moving direction (sub-scanning direction) of an image bearing member.

Another object of the present invention is to provide an image forming apparatus and a gradation correction method capable of not only limiting an increase in a density detection period but also limiting a decrease in density detection accuracy due to density affecting factors, such as a scratch present along the main scanning direction.

To achieve at least one of the objects described above, an image forming apparatus reflecting one aspect of the present invention includes an image formation section that forms a plurality of patch bands at a plurality of positions in a main scanning direction on an image bearing member, each of the plurality of patch bands having a plurality of gradation patches disposed in a sub-scanning direction; a density detection section that detects densities of the plurality of patch bands; and a control section that performs gradation correction based on detection results from the density detection section. The plurality of patch bands differs from each other.

A gradation correction method for an image forming apparatus reflecting another aspect of the present invention includes a first step of forming a plurality of patch bands by using an image formation section, the plurality of patch bands being disposed at a plurality of positions in a main scanning direction on an image bearing member, each of the plurality of patch bands having a plurality of gradation patches disposed in a sub-scanning direction; a second step of detecting densities of the plurality of patch bands by using a density detection section; and a third step of performing gradation correction by using a control section, based on detection results from the density detection section. The plurality of patch bands differs from each other.

BRIEF DESCRIPTION OF DRAWINGS

The present invention will become more fully understood from the detailed description given hereinbelow and the appended drawings which are given by way of illustration only, and thus are not intended as a definition of the limits of the present invention, and wherein:

FIG. 14A shows the configuration of a patch band used in Embodiment 2 according to the present invention;

FIG. 14B shows the configuration of another patch band used in Embodiment 2 according to the present invention;

DESCRIPTION OF THE PREFERRED EMBODIMENTS

Embodiments according to the present invention will now be described in detail with reference to the accompanying drawings.

[1] Overall Configuration

Figure 3:
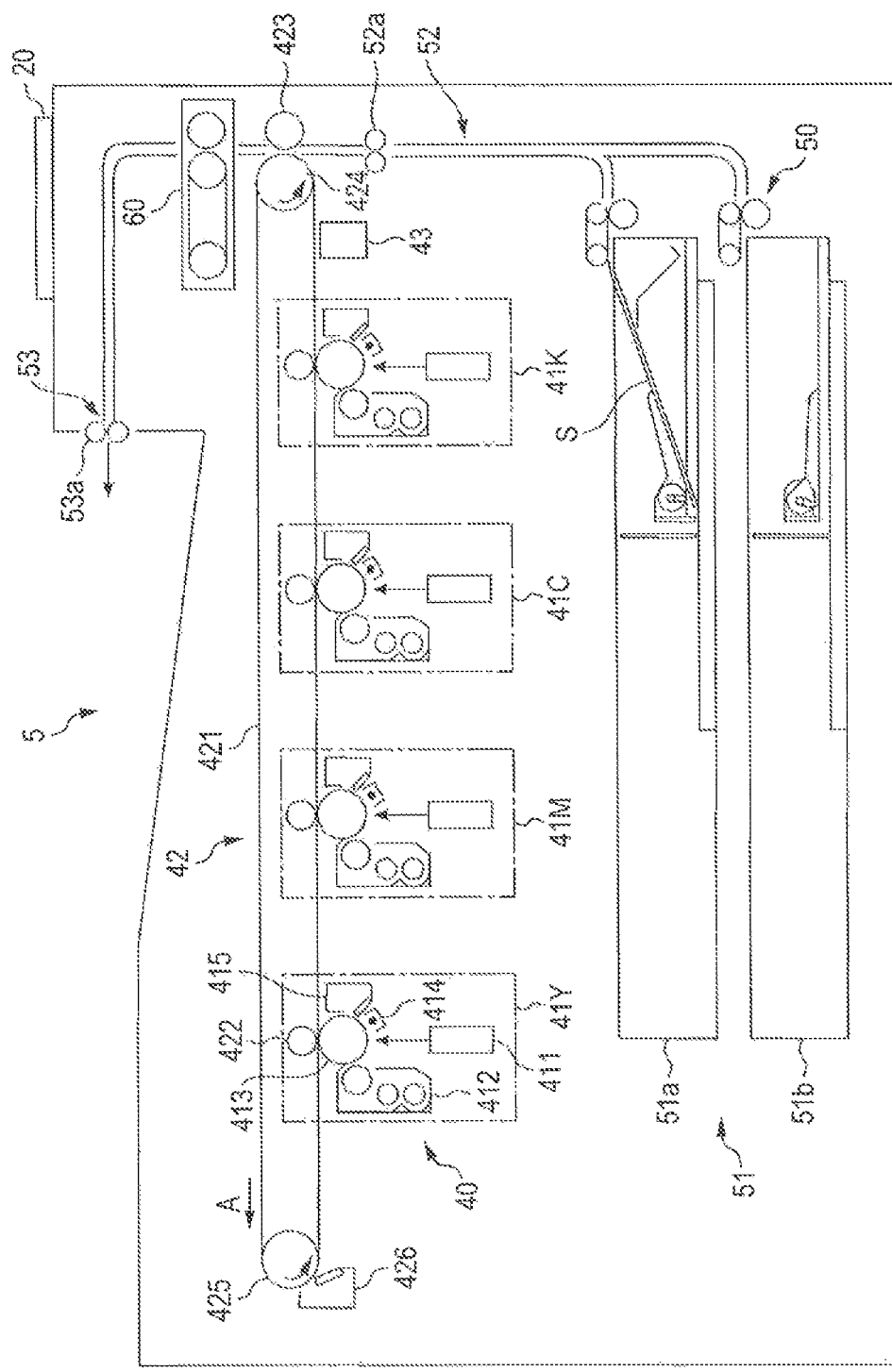
FIG. 3 is a longitudinal cross-sectional view of an image forming apparatus according to the present invention.

Image forming apparatus 5 shown in FIG. 3 includes, for example, image forming section 40, intermediate transfer section 42, density detection sensor 43, transport section 50, fixing section 60, and operation display section 20. Image forming apparatus 5 is a color image forming apparatus based on an intermediate transfer scheme using an electrophotographic process. Image forming apparatus 5 performs primary transfer for color toner images of C (cyan), M (magenta) Y (yellow), and BK (black) formed on photoconductors 413 onto intermediate transfer belt 421 to superimpose the four color toner images on top of each other on intermediate transfer belt 421 and then performs second transfer of the superimposed toner images onto a sheet to form a final image.

Image forming apparatus 5 also employs a tandem scheme, wherein photoconductors 413 corresponding to the four colors C, M, Y, and K are serially disposed in the moving direction of intermediate transfer belt 421, and the color toner images are sequentially transferred onto intermediate transfer belt 421 during one rotation.

Image forming section 40 includes image forming sections 41Y, 41M, 41C, and 41K for forming images based on input image data by using Y- M- C- and K-colored toners, respectively.

Image forming sections 41Y, 41M, 41C, and 41K for components Y, M, C, and K have the same configuration. Common components have the same reference signs for convenience of illustration and description. To distinguish the common components from each other, Y, M, C, or K is attached to a reference sign. In FIG. 3, components of image forming section 41Y for component Y only bear reference sign Y, and components of other image forming sections 41M, 41C, and 41K do not bear reference signs M, C, and K.

The configuration of image forming section 40 will be described with reference to image forming section 41Y. Image forming section 41Y includes light exposure device 411, developing device 412, photoconductor 413, charger 414, and drum cleaning device 415.

Photoconductor 413 is a negative charge-type organic photoconductor (OPC) having photoconductivity, which is fabricated by sequentially laminating an under coat layer (UCL), a charge generation layer (CGL), and a charge transport layer (CTL) around a conductive cylinder made, for example, of aluminum.

Charger 414 evenly and negatively charges the surface of photoconductor 413. Light exposure device 411 is formed, for example, of a semiconductor laser and directs laser light to photoconductors 413 bearing thereon an image for its corresponding color component. When photoconductors 413 are irradiated with laser light, positive charges are produced in the charge generation layer of photoconductor 413 and transported to the surface of the charge transport layer. The charges on the surface of photoconductor 413 are then neutralized. In this way, electrostatic latent images for the respective colors are thus formed on the surface of respective photoconductors 413.

Developing devices 412 accommodate therein developers corresponding to the respective colors. The developers are, for example, two-component developers formed of a toner and a carrier. Developing device 412 develops the electrostatic latent image on the surface of photoconductor 413 with the toner to form a visualized toner image. The developer may alternatively be a one-component toner.

Drum cleaning device 415 includes a drum cleaning blade that is in contact with and slides over the surface of photoconductor 413 for cleaning. The drum cleaning blade scrapes and removes an untransferred toner left on the surface of photoconductor 413 after the primary transfer.

Intermediate transfer section 42 includes, for example, intermediate transfer belt 421, which functions as an intermediate transfer member, primary transfer roller 422, secondary transfer roller 423, drive roller 424, driven roller 425, and belt cleaning device 426. Intermediate transfer belt 421 functions as an image bearing member in the present invention.

Intermediate transfer belt 421 is formed of an endless belt which is wrapped around drive roller 424 and driven roller 425 in a tensioned state. Intermediate transfer belt 421 travels at a fixed speed in arrowed direction A when drive roller 424 rotates. When primary transfer rollers 422 press intermediate transfer belt 421 against photoconductors 413, the color toner images are sequentially superimposed to undergo primary transfer onto intermediate transfer belt 421. Then, when secondary transfer roller 423 presses intermediate transfer belt 421 against sheet S, the toner images on intermediate transfer belt 421 undergo secondary transfer onto sheet S.

Belt cleaning device 426 includes a belt cleaning blade that is in contact with and slides over the surface of intermediate transfer belt 421 when cleaning. The belt cleaning blade scrapes and removes an untransferred toner left on the surface of intermediate transfer belt 421 after the secondary transfer.

Density detection sensor 43 is so disposed that it faces intermediate transfer belt 421 on the upstream side of the secondary transfer position in the moving direction (also referred to as "sub-scanning direction") of intermediate transfer belt 421, the secondary transfer position being where the toner images undergo the secondary transfer onto sheet S. Density detection sensor 43 detects the density of a gradation patch on the surface of intermediate transfer belt 421. Density detection sensor 43 will be detailed later.

Fixing section 60 is configured based on a belt heating scheme. That is, fixing section 60 includes an upper pressurizing section and a lower pressurizing section that form a fixing nip section. The upper pressurizing section includes a heating roller and a fixing roller. An endless fixing belt stretched at a predetermined belt tension is wrapped around the heating roller and the fixing roller. The lower pressurizing section includes a pressurizing roller. The pressurizing roller is pressed at a predetermined load against the fixing roller via the fixing belt. The fixing nip portion, where sheet S is sandwiched for transportation, is thus formed between the fixing roller and the pressurizing roller. Fixing section 60 heats and pressurizes transported sheet S in the fixing nip section to fix the toner images on sheet S.

Transport section 50 includes sheet feeding section 51, transport mechanism 52, and sheet ejecting section 53. Two sheet feeding trays 51a and 51b that form sheet feeding section 51 accommodate sheets S on a preset type basis, sheets S being identified based on the basis weight, the size, or any other factor (standard sheet or special sheet, for example).

The uppermost sheet among sheets S accommodated in sheet feeding trays 51a and 51b is transported one by one to secondary transfer roller 423 by transport mechanism 52, which includes a plurality of transport rollers, such as registration rollers 52a. At this point, registration rollers 52a correct the inclination of fed sheet S and adjust transport timing. The color toner images on intermediate transfer belt 421 then together undergo the secondary transfer onto sheet S and are fixed in fixing section 60. Fixed sheet S is ejected out of image forming apparatus 5 through sheet ejecting section 53, which includes sheet ejecting rollers 53a.

As described above, in image forming apparatus 5, image forming section 40 operates as follows: light exposure device 411 forms an electrostatic latent image on photoconductor 413 based on input image data; developing device 412 develops the latent image on photoconductor 413 to form a toner image; the toner image formed on photoconductor 413 undergoes the primary transfer onto intermediate transfer belt 421; and the toner image on intermediate transfer belt 421 undergoes the secondary transfer onto sheet S.

Figure 4:
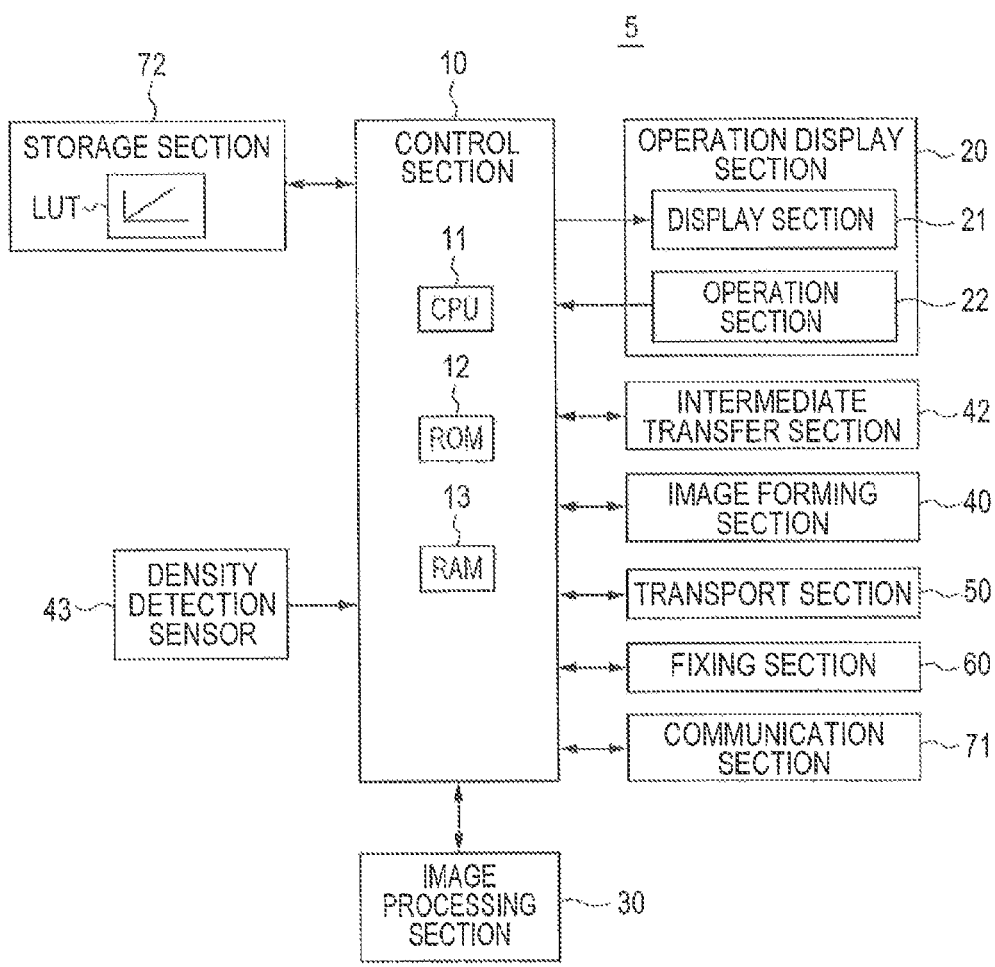
FIG. 4 is a control block diagram of the image forming apparatus according to the present invention.

A control system of image forming apparatus 5 will next be described with reference to a control block diagram shown in FIG. 4. Image forming apparatus 5 includes, for example, control section 10, operation display section 20, image processing section 30, image forming section 40, transport section 50, fixing section 60, intermediate transfer section 42, and density detection sensor 43, as shown in FIG. 4.

Control section 10 includes, for example, central processing unit (CPU) 11, read only memory (ROM) 12, and random access memory (RAM) 13. CPU 11 reads from ROM 12 a program according to an intended process to be carried out, loads the program into RAM 13, and cooperates with the loaded program to control the operation of each section in image forming apparatus 5. In the control processes, a variety of data stored in storage section 72 are referred to. Storage section 72 is formed, for example, of a flash memory, a hard disk drive, or any other nonvolatile semiconductor memory.

Control section 10 sends and receives a variety of data to and from an external apparatus (personal computer, for example) connected to a local area network (LAN), a wide area network (WAN), or any other communication network via communication section 71. For example, control section 10 receives image data sent from the external apparatus and forms an image on a sheet based on the image data. Communication section 71 is formed, for example, of an LAN card or any other communication control card.

Operation display section 20 is composed, for example, of a liquid crystal display (LCD) with a touch panel and functions as display section 21 and operation section 22. Display section 21 displays a variety of operation screens, images, the operation status of each function, and other information in accordance with a display control signal input from control section 10. Operation section 22 includes a numerical keypad, a start key, and a variety of other operation keys. Operation section 22 outputs operation signals corresponding to various types of user's input operation to control section 10.

Image processing section 30 includes circuits and other components that perform digital image processing on the input image data in accordance with an initial setting or a user setting. For example, image processing section 30 produces a gradation correction table based on gradation correction data to perform gradation correction, under the control of control section 10. Control section 10 and image processing section 30 function as a gradation correction section in the present invention.

Image processing section 30 further performs gradation correction, color correction, shading correction, and other various types of correction, and compression on the input image data. Image forming section 40 forms an image based on digital image data having undergone the processes described above.

Figure 5:
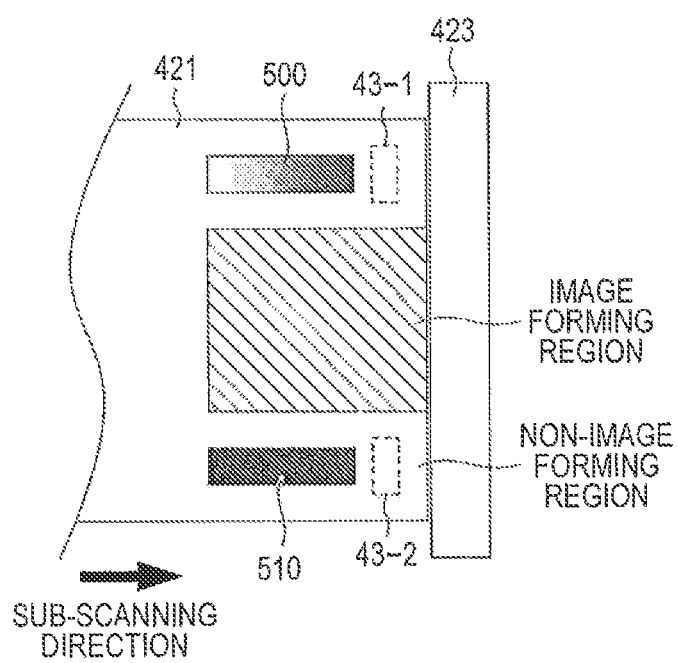
FIG. 5 shows the positional relationship between a density detection sensor and first and second regions.

Density detection sensor 43 (43-1 and 43-2) in image forming apparatus 5 will now be detailed. Two density detection sensors 43-1 and 43-2 are so disposed that they face each other, for example, on both sides in the width direction of intermediate transfer belt 421 (also referred to as "main scanning direction"), as shown in FIG. 5. The width direction of intermediate transfer belt 421 is perpendicular to the moving direction (also referred to as "sub-scanning direction") of intermediate transfer belt 421. Each of density detection sensors 43-1 and 43-2 detects the density of a gradation patch on the surface of intermediate transfer belt 421. Specifically, density detection sensors 43-1 and 43-2 detect the densities of first region 500 and second region 510 located in non-image forming regions on both sides in the main scanning direction of intermediate transfer belt 421. In FIG. 5, an image forming region is a region where image forming section 40 can form a toner image based on the input image data. The non-image forming regions are regions where image forming section 40 forms no toner image.

An example of the configuration of density detection sensor 43 will now be described. Each of density detection sensors 43-1 and 43-2 can be a reflective optical sensor formed, for example, of a light emitting diode (LED) or any other light emitting element and a photodiode (PD) or any other light receiving element, the reflective optical sensor detecting the densities of a toner pattern as reflection densities. Each reflection density of a toner pattern is expressed as $-\log(I/I0)$, where I0 represents the amount of light incident on an object to be detected and I represents the amount of light reflected from the object to be detected. Density detection sensor 43 functions as a density detection section in the present invention.

A light receiving section includes a light receiving element, and obtains a sensor output by converting the amount of light received by the light receiving element into an intensity of an electric signal. A gradation patch is made up of a belt surface and a toner surface, and density detection sensors 43-1 and 43-2 detect a toner hiding ratio (i.e., the ratio of an area occupied by toner to the area of the entire gradation patch). The sensor output decreases as the amount of light reflected from the belt surface decreases. As the density of the gradation patch increases, the hiding ratio of belt by toner increases thereby decreasing the sensor output. Therefore, it is possible to detect the hiding ratio of belt surface by toner, that is, the density of the gradation patch, through the magnitude of the sensor output (see FIG. 16). Each of density detection sensors 43-1 and 43-2 is not necessarily configured as described above but may be any sensor capable of density detection.

The amount of reflected light I decreases and the sensor output value (reflection density) output from each of density detection sensors 43-1 and 43-2 increases as the density of a gradation patch formed on intermediate transfer belt 421 increases. An image of a high-density gradation patch is, for example, the maximum-density black solid image. Conversely, the amount of reflected light I increases and the sensor output value output from each of density detection sensors 43-1 and 43-2 decreases as the density of a gradation patch formed on intermediate transfer belt 421 decreases. An image of a low-density gradation patch is, for example, a white solid image or a base surface of intermediate transfer belt 421 with no toner image formed thereon.

The number and arrangement of density detection sensors 43 are not limited to those described above. That is, any number and arrangement can be employed as long as the densities of first region 500 and second region 510 on intermediate transfer belt 421 are detected. For example, the number of density detection sensors 43 may be one. In this case, a single sensor needs to detect the densities of the two regions, first region 500 and second region 510. To this end, it is desirable to minimize the distance between first region 500 and second region 510 in the width direction of intermediate transfer belt 421 in consideration of the detectable range of density detection sensor 43. For example, first region 500 and second region 510 may be formed in one of the non-image forming regions on both sides in the width direction of intermediate transfer belt 421. When intermediate transfer belt 421 is made of a light transmissive material, density detection sensor 43 can be a transmissive optical sensor formed of a light emitting element and a light receiving element facing each other across intermediate transfer belt 421.

First region 500 and second region 510 will now be detailed, the densities of which are detected by density detection sensor 43. First region 500 and second region 510 are located in different positions in the main scanning direction of intermediate transfer belt 421 but located in the same position in the sub-scanning direction of intermediate transfer belt 421, as shown in FIG. 5. The width of each of first region 500 and second region 510 is set at a value greater than or equal to a detectable width of density detection sensor 43 so that density detection sensor 43 can accurately detects the densities of the regions 500 and 510.

[2] Gradation Correction

Next, gradation correction will be described in detail. It is noted that in the present description, "gradation level" may be restated as "density", and conversely, "density" may be restated as "gradation level".

Figure 6:
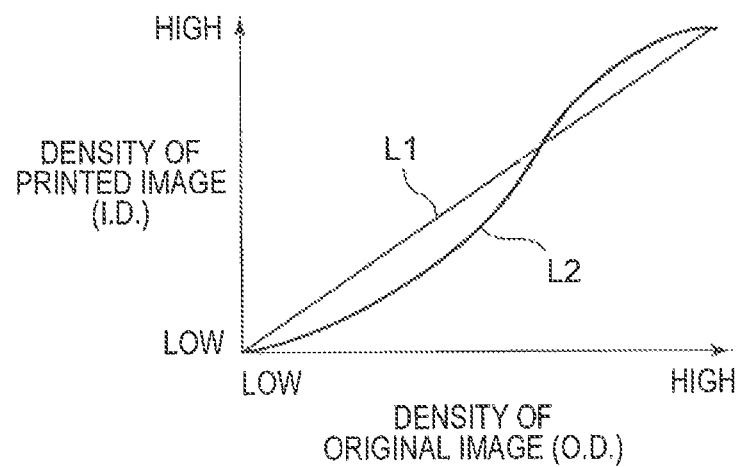
FIG. 6 shows a gradation characteristic, i.e., the relationship between the densities of an input original image and the densities of an actual printed image.

FIG. 6 is a diagram to show gradation characteristics which is the relationship between density O.D. and density I.D. when it is supposed that the density indicated by input original image data is O.D. (Original Density), and the density of a printed image output on recording paper S is I.D. (Image Density). Maintaining a linear relationship such as shown by gradation characteristic line L1 of FIG. 6 in the relationship between density O.D. and density I.D. will make it possible to obtain an ideal printed image.

However, in reality, the relationship between density O.D. and density I.D. will become a nonlinear relationship as shown by gradation curve L2 of FIG. 6 due to fluctuation factors such as changes in the surrounding environment such as temperature and humidity, and variations in durability and production of the apparatus. As a result of this, the density of a printed image will significantly change for each gradation level from original image data to be input. As seen from gradation curve L2, normally, in a region where original image data is low in density, since printed image density I.D. becomes lower than original image density O.D., loss of color detail in highlights occurs so that it becomes difficult to reproduce a printed image having a very low density on recoding paper S. Further, in a region where original image data is high in density, since printed image density I.D. becomes higher than original image density O.D., loss of color detail in shadows occurs so that it becomes difficult to reproduce a density difference around the maximum density on recording paper S.

Accordingly, to match the density of a printed image with the density indicated by input original image data, it is necessary to correct gradation characteristics. To be specific, the relation between density O.D. and density I.D. is made to be stably linear at every gradation level by gradation correction. In reality, gradation correction is performed by correcting a gradation conversion table provided in control section 10.

A method for creating the gradation conversion table will now be described. To perform gradation correction, image forming apparatus 5 forms patch band (also referred to as "gradation pattern image") 50 shown in FIG. 7 on intermediate transfer belt 421, and density detection sensor 43 detects the densities of patch band 50. Patch band 50 is formed of a plurality of gradation patches P1 to P11 having different gradations. The gradation levels of gradation patches P1 to P11 are, for example, set at 100%, which is the maximum gradation level, 90%, 80%, 70%, 60%, 50%, 40%, 30%, 20%, 10%, and 0%, respectively. The lengths of gradation patches P1 to P11 are so sized that density detection sensor 43 can accurately detect gradation patches P1 to P11. The width of each gradation patch (which may instead be referred to as the width of patch band 50) is so sized that the gradation patch can sufficiently be detected independently of variations in the aperture diameter of density detection sensor 43, the attachment of density detection sensor 43, the position for forming an image in the main scanning direction, and other factors.

Figure 7:
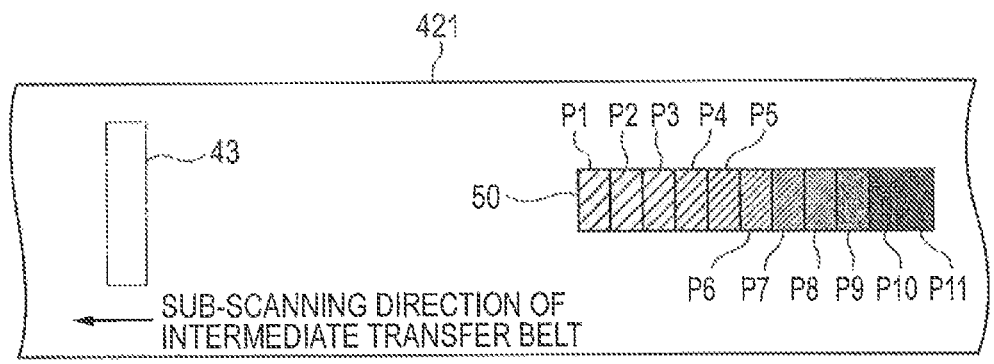
FIG. 7 describes a patch band and gradation patches.
Figure 8:
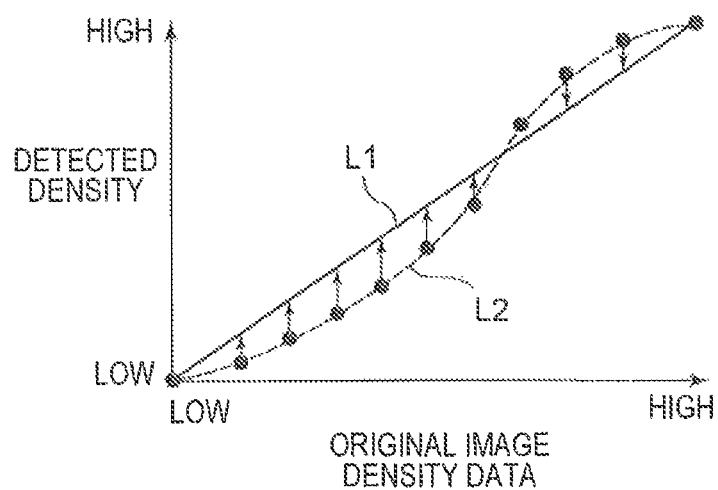
FIG. 8 shows densities of a patch band detected by the density detection sensor versus original image density data.
Figure 9:
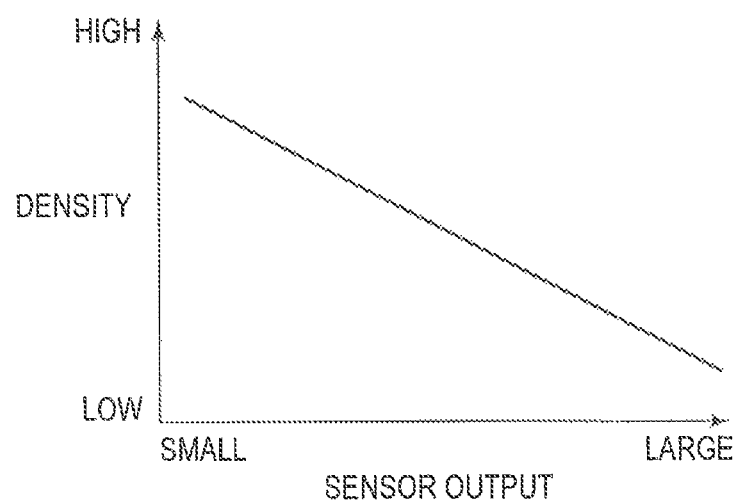
FIG. 9 shows the relationship between output values of the density detection sensor and densities.

FIG. 8 shows densities of patch band 50 (printed image densities) detected by density detection sensor 43 versus original image density data. The filled circles in FIG. 8 represent the detected densities of gradation patches P1 to P11 (FIG. 7). Each of the detected densities can be determined by converting a sensor output into a density based on a pre-created conversion table representing the relationship between densities and sensor outputs from density detection sensor 43, as shown in FIG. 9. As seen from FIG. 8, the detected densities are present on gradation curve L2 and deviate from target gradation characteristic line L1. It is therefore necessary to perform gradation correction that corrects the deviation.

Figure 10:
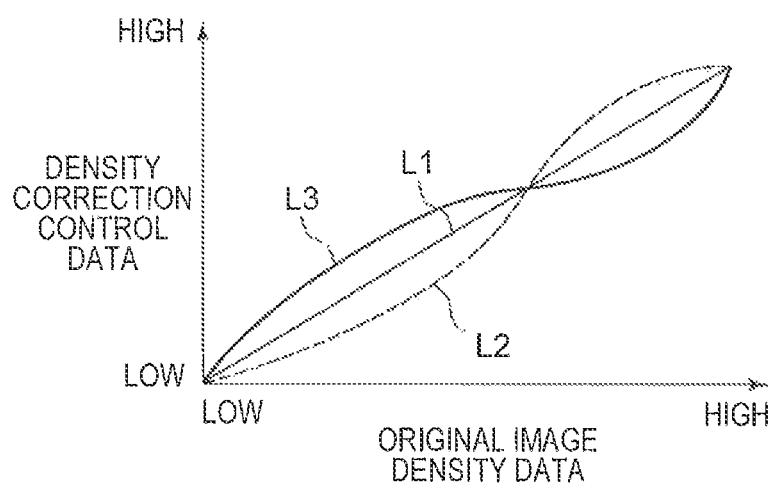
FIG. 10 shows the characteristic of a gradation conversion table (curve L3 in the figure)

FIG. 10 shows the characteristic of the gradation conversion table provided in control section 10. Curve L3 in FIG. 10 represents corrected data in a gradation conversion table. The correction data represented by curve L3 are values for canceling the deviation of gradation curve L2 from target gradation characteristic line L1. That is, when original image data are input, toner image formation performed by image forming section 40 (41Y, 41M, 41C, and 41K) may be controlled by using the correction control data on curve L3 that correspond to the original image data. The densities of the gradation patches can thus be corrected to densities on target gradation characteristic line L1.

<Embodiment 1>

Figure 11:
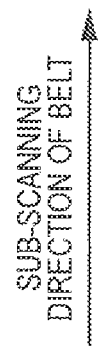
FIG. 11A shows the configuration of a patch band used in Embodiment 1 according to the present invention.
FIG. 11B shows the configuration of another patch band used in Embodiment 1 according to the present invention.

Embodiment 1 relates to a gradation correction method preferably used when image unevenness occurs in the sub-scanning direction of intermediate transfer belt 421. In first region 500, image forming section 40 forms ten gradation patches P1 to P10 continuously along the sub-scanning direction of intermediate transfer belt 421, as shown in FIG. 11A.

Grayscale patches P1 to P10 are used for generating gradation correction data and have densities that change stepwise.

In the present embodiment, assuming that lightness and darkness of an image are expressed by 256 gradation levels, input gradation levels corresponding to the densities of an input image for forming gradation patches P1 to P10 vary stepwise from 0 (white solid portion) to 255 (black solid portion). That is, the plurality of gradation patches P1 to P10 are so arranged that the density decreases from the downstream side (where gradation patch is formed earlier) toward the upstream side (where gradation patch is formed later) in the sub-scanning direction of intermediate transfer belt 421.

Density detection sensor 43 detects the reflection densities of gradation patches P1 to P10 sequentially from first gradation patch P10. The reflection density corresponds to the color density of the surface of intermediate transfer belt 421.

In second region 510, image forming section 40 transfers ten reference patches P11 to P20 continuously along the sub-scanning direction of intermediate transfer belt 421, as shown in FIG. 11B.

Reference patches P11 to P20 are formed to determine whether or not image unevenness has occurred in the sub-scanning direction of intermediate transfer belt 421 and have the same density (input gradation level). In the present embodiment, each of reference patches P11 to P20 is a black solid image having the maximum density (input gradation level of 255). When it is determined that image unevenness has occurred, reference patches P11 to P20, along with gradation patches P1 to P10, are used to generate gradation correction data.

Density detection sensor 43 detects the reflection densities of reference patches P11 to P20 sequentially from first reference patch P20.

It can be determined whether or not image unevenness has occurred based on the reflection densities of reference patches P11 to P20. This is because when no image unevenness has occurred, the reflection densities of reference patches P11 to P20 are substantially the same, whereas when image unevenness has occurred, the reflection densities of reference patches P11 to P20 greatly vary. A high-density image particularly tends to be affected by image unevenness. Thus, each of reference patches P11 to P20 is a black solid image having the maximum density in the present embodiment. Whether or not image unevenness has occurred can therefore be readily determined.

When image unevenness has occurred, the gradation characteristic of image forming section 40 derived from detection results on gradation patches P1 to P10 from density detection sensor 43 differs from the gradation characteristic derived from detection results obtained when no image unevenness has occurred, and hence cannot be said to be an accurate gradation characteristic. Grayscale correction based on the thus derived gradation characteristic will not provide appropriate image stabilization control.

To address the problem, in the present embodiment, when image unevenness has occurred, not only detection results on gradation patches P1 to P10 from density detection sensor 43 but also detection results on reference patches P11 to P20 from density detection sensor 43 are used to acquire an accurate gradation characteristic of image forming section 40, and then a gradation correction data generation process is carried out to generate appropriate gradation correction data. Specifically, the gradation correction data generation process is carried out in accordance with the flowchart shown in FIG. 12.

Figure 12:
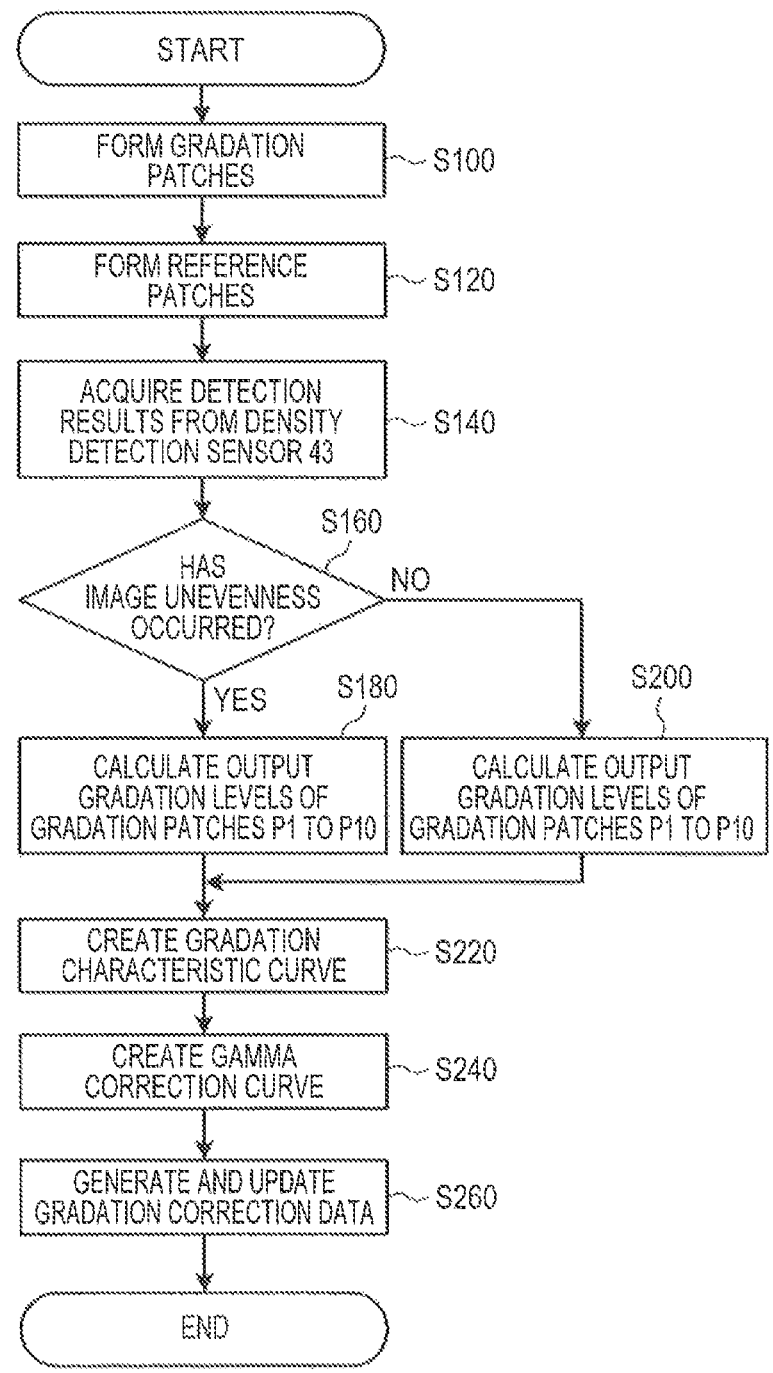
FIG. 12 is a flowchart showing an example of gradation correction in the image forming apparatus representing Embodiment 1 according to the present invention.

The gradation correction data generation process shown in FIG. 12 is, for example, carried out by CPU 11 that executes a predetermined program stored in ROM 12 after image forming apparatus 5 is powered on. Further, the gradation correction data generation process is desirably carried out on a regular basis, for example, when a predetermined period has elapsed after the preceding gradation correction data generation process was carried out, when a predetermined number of images have been formed, or when the apparatus returns from a sleep mode (power-saving mode).

Control section 10 first controls image forming section to form gradation patches P1 to P10 in first region 500 on intermediate transfer belt 421 (step S100). Image data on gradation patches P1 to P10 are stored, for example, in ROM 12.

Control section 10 then controls image forming section 40 to form reference patches P11 to P20 in second region 510 on intermediate transfer belt 421 (step S120). Image data on reference patches P11 to P20 are stored, for example, in ROM 12.

Control section 10 then acquires detection results on gradation patches P1 to P10 and reference patches P11 to P20 from density detection sensor 43 (step S140). The acquired detection results are temporarily stored in RAM 13. Grayscale patches P1 to P10 and reference patches P11 to P20 formed on intermediate transfer belt 421 pass through a region where density detection sensor 43 performs density detection. These patches are then removed by belt cleaning device 426.

Control section 10 then determines whether or not image unevenness has occurred in the sub-scanning direction of intermediate transfer belt 421 based on the reflection densities of reference patches P11 to P20 (step S160). For example, control section 10 averages the reflection densities of reference patches P11 to P20, and when any one of the reference patches shows a reflection density that deviates from the calculated average by a predetermined value or more, control section 10 determines that image unevenness has occurred.

When control section 10 determines that image unevenness has occurred (YES in step S160), control section 10 calculates output gradation levels of gradation patches P1 to P10 based on the detection results obtained in step S140 (step S180). Specifically, control section 10 uses reflection densities CP($n$+10) (CP11 to CP20) of reference patches P11 to P20 to perform 8-bit normalization on reflection densities CP$n$ (CP1 to CP10) of gradation patches P1 to P10 in accordance with Equation (1) below. The output gradations are thereby calculated so that the normalized reflection density of gradation patch P10 (black solid portion) is 0 and the normalized reflection density of gradation patch P1 (white solid portion) is 255.

$$\text{Output gradation} = \{(CPn - CP(n+10))/(CP1 - CP(n+10))\} \times 255 \quad (1)$$

For example, the output gradation of gradation patch P5 is calculated through 8-bit normalization on reflection density CP5 of gradation patch P5 in accordance with the following Equation (2):

$$\text{Output gradation} = \{(CP5 - CP15)/(CP1 - CP15)\} \times 255 \quad (2)$$

The output gradation level of gradation patch P8 is calculated through 8-bit normalization on reflection density CP8 of gradation patch P8 in accordance with the following Equation (3):

$$\text{Output gradation level} = \{(CP8 - CP18)/(CP1 - CP18)\} \times 255 \quad (3)$$

As described above, an output gradation level of each of gradation patches P1 to P10 is calculated using the reflection density of the reference patch located in the same position as the gradation patch to be calculated in the sub-scanning direction of intermediate transfer belt 421. This is because when image unevenness has occurred, a gradation patch and a reference patch located in the same position in the sub-scanning direction of intermediate transfer belt 421 are believed to be identically affected by the image unevenness. Output gradation levels of gradation patches P1 to P10 are calculated by commonly using reflection density CP1 of gradation patch P1. This is because gradation patch P1 having the minimum density is hardly affected by image unevenness.

On the other hand, when it is determined that no image unevenness has occurred (NO in step S160), control section 10 calculates output gradations of gradation patches P1 to P10 based on the detection results obtained in step S140 (step S200). Specifically, control section 10 refers to a conversion table for converting a reflection density into an output gradation, and thereby calculates output gradations of gradation patches P1 to P10 from reflection densities CP$n$ (CP1 to CP10) of gradation patches P1 to P10. The conversion table is stored, for example, in ROM 12.

In step S220, control section 10 relates the input gradation levels of gradation patches P1 to P10 to the output gradation levels calculated in step S180 or S200 to create a gradation characteristic curve. The gradation characteristic curve is, for example, expressed by curve L1 shown in FIG. 13.

Figure 13:
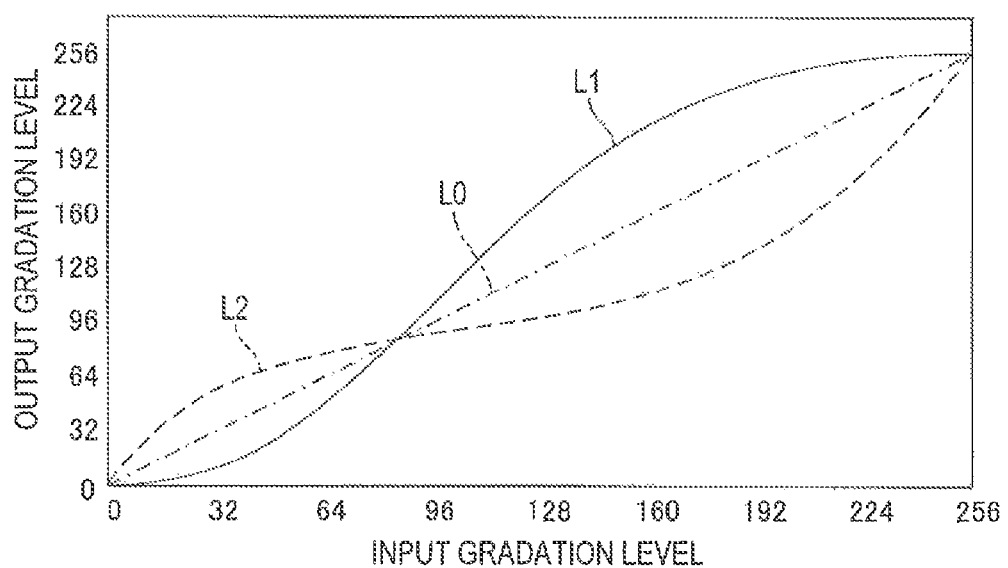
FIG. 13 shows a gradation characteristic curve and a gradation correction curve employed in Embodiment 1 according to the present invention.

Control section 10 then creates gamma correction curve L2 for reproducing the gradation levels of the input image in an output image with high fidelity, that is, correcting the gradation levels of the input image to provide target gradation characteristic L0 shown in FIG. 13, based on gradation characteristic curve L1 created in step S220 (step S240). Grayscale correction curve L2 is expressed by a curve line-symmetrical to gradation characteristic curve L1 with respect to target gradation characteristic L0. Now let x be an input gradation level and y be an output gradation level, and express gradation characteristic curve L1 as y=f(x). Since target gradation characteristic L0 is expressed as y=x, gradation correction curve L2 is the inverse function of gradation characteristic curve L1 (y=f$^{-1}$(x)).

Finally, control section 10 creates a gradation correction table in accordance with the gradation correction data, which relate input gradation levels to corrected gradation levels to which the input gradation levels need to be corrected, based on gradation correction curve L2 created in step S240 and updates the preceding gradation conversion table (step S260). The gradation correction data are stored, for example, in RAM 13. In the following image formation, gradation correction is performed by referring to the updated gradation correction data, and the image formation conditions are determined based on the corrected gradation levels. When the process in step S260 is completed, image forming apparatus 5 completes the gradation correction data generation process.

As described above in detail, in Embodiment 1, a plurality of gradation patches P1 to P10 having different densities are formed in first region 500, and reference patches P11 to P20 are formed in second region 510 along the sub-scanning direction of intermediate transfer belt 421. Density detection sensor 43 detects the reflection densities of gradation patches P1 to P10 located in first region 500 and the reflection densities of reference patches P11 to P20 located in second region 510. The output gradation levels of gradation patches P1 to P10 calculated from the reflection densities of gradation patches P1 to P10 are then corrected based on the reflection densities of reference patches P11 to P20, and the gradation characteristic of image forming section 40 is acquired from the corrected output gradation levels and the input gradation levels of gradation patches P1 to P10. Based on the acquired gradation characteristic, gradation correction data are generated.

According to thus configured Embodiment 1, when image unevenness occurs in the sub-scanning direction of intermediate transfer belt 421, the reflection densities of reference patches P11 to P20, which tend to be affected by image unevenness, can be used to cancel the effect of the image unevenness that varies across gradation patches P1 to P10. Output gradation levels of gradation patches P1 to P10 can thus be accurately calculated. The resultant gradation characteristic is close to a gradation characteristic derived from detection results obtained when no image unevenness occurs.

Appropriate image stabilization control can therefore be performed through gradation correction based on the resultant gradation characteristic.

In Embodiment 1, whether or not image unevenness has occurred is determined, and output gradation levels of gradation patches P1 to P10 are calculated based on the reflection densities of gradation patches P1 to P10 and the reflection densities of reference patches P11 to P20 only when it is determined that image unevenness has occurred. Thereby, when no image unevenness has occurred, output gradation levels of gradation patches P1 to P10 can be calculated without unnecessary calculation for canceling the effect of image unevenness by using the reflection densities of reference patches P11 to P20.

In Embodiment 1, density detection sensor 43 detects the reflection densities of gradation patches P1 to P10 and the reflection densities of reference patches P11 to P20 at the same time. It is thus possible to quickly acquire the reflection densities of gradation patches P1 to P10 and reference patches P11 to P20 necessary to calculate output gradation levels of gradation patches P1 to P10, further enabling quick gradation correction.

In Embodiment 1, first region 500 and second region 510 are located in the non-image forming regions on both sides in the main scanning direction of intermediate transfer belt 421. The gradation correction described above can therefore be performed even when image formation is being performed.

Embodiment 1 has been described with reference to the case where reference patches P11 to P20 have the maximum density, but they may alternatively have an intermediate density. However, to calculate output gradation levels of gradation patches P1 to P10 so as to effectively cancel the effect of image unevenness, reference patches P11 to P20 desirably have the maximum density, which tends to be most affected by image unevenness.

In Embodiment 1 described above, reference patches P11 to P20 are not necessarily disposed as shown in Embodiment 1. Essentially, gradation patches P1 to P10 only need to be in the same positions as those of reference patches P11 to P20, respectively, in the sub-scanning direction of intermediate transfer belt 421.

Embodiment 1 has been described with reference to the case where output gradation levels of gradation patches P1 to P10 are calculated based on the reflection densities of gradation patches P1 to P10 and the reflection densities of reference patches P11 to P20 only when it is determined that image unevenness has occurred, but the present invention is not limited thereto. For example, even when it is determined that no image unevenness has occurred, the output gradation levels may be calculated in accordance with Equation (1) described above based on the reflection densities of gradation patches P1 to P10 and the reflection densities of reference patches P11 to P20.

Embodiment 1 has been described with reference to the case where the reflection densities of gradation patches P1 to P10 and the reflection densities of reference patches P11 to P20 are detected at the same time, but the present invention is not limited thereto. For example, the reflection densities of gradation patches P1 to P10 may be detected during a first turn of intermediate transfer belt 421, and the reflection densities of reference patches P11 to P20 may be detected during a second turn of intermediate transfer belt 421. From the viewpoint of quickly performing the gradation correction, however, it is desirable to quickly acquire the reflection densities of gradation patches P1 to P10 and reference patches P11 to P20, and the reflection densities of gradation patches P1 to P10 and the reflection densities of reference patches P11 to P20 are preferably detected at the same time.

In Embodiment 1, a description has been made for a gradation correction method suitable for the case of occurrence of image unevenness in the sub-scanning direction of intermediate transfer belt 421, i.e., a method for determining the gradation characteristic of image forming section 40 by using the reflection densities of gradation patches P1 to P10 and the reflection densities of reference patches P11 to P20.

<Embodiment 2>

In Embodiment 2, a method suitable for the case of occurrence of reflection unevenness in the sub-scanning direction of intermediate transfer belt 421 will be disclosed. The basic configuration of image forming apparatus 5 is the same as that in Embodiment 1, and no description thereof will therefore be made.

FIGS. 14A and 14B show the configuration of patch bands used in Embodiment 2. Image forming section 40 transfers ten gradation patches P1 to P10 in first region 500 shown in FIG. 5 continuously along the sub-scanning direction of intermediate transfer belt 421, as shown in FIG. 14A. Grayscale patches P1 to P10 are the same as those described in Embodiment 1, and no description thereof will therefore be made.

Ten reference patches P21 to P30 are formed in second region 510 along the sub-scanning direction of intermediate transfer belt 421, as shown in FIG. 14B. Reference patches P21 to P30 having the same density are used for determining whether or not reflection unevenness has occurred in the sub-scanning direction of intermediate transfer belt 421. In Embodiment 2, the base surface having the minimum density (input gradation level of 0) in intermediate transfer belt 421 is used as reference patches P21 to P30. In other words, reference patches P21 to P30 are, in practice, regions where image forming section 40 transfers no toner image. When it is determined that reflection unevenness has occurred, reference patches P21 to P30 along with gradation patches P1 to P10 are used to generate gradation correction data.

Density detection sensor 43 detects the reflection densities of reference patches P21 to P30 sequentially from first reference patch P30.

It can be determined whether or not reflection unevenness has occurred in the sub-scanning direction of intermediate transfer belt 421 based on the reflection densities of reference patches P21 to P30. This is because when no reflection unevenness occurs, the reflection densities of reference patches P21 to P30 are substantially the same, whereas when reflection unevenness occurs, the reflection densities of reference patches P21 to P30 greatly vary. A low-density image particularly tends to be affected by reflection unevenness. The base surface having the minimum density in intermediate transfer belt 421 is thus used as reference patches P21 to P30 in the present embodiment. Whether or not reflection unevenness has occurred can therefore be readily determined.

When reflection unevenness has occurred, the gradation characteristic of image forming section 40 derived from detection results on gradation patches P1 to P10 from density detection sensor 43 differs from a gradation characteristic derived from detection results obtained when no reflection unevenness has occurred, and hence cannot be said to be an accurate gradation characteristic. Grayscale correction based on the thus derived gradation characteristic will not provide appropriate image stabilization control.

To address the problem, in the present embodiment, when reflection unevenness has occurred, not only detection results on gradation patches P1 to P10 from density detection sensor 43 but also detection results on reference patches P21 to P30 from density detection sensor 43 are used to acquire an accurate gradation characteristic of image forming section 40, and then a gradation correction data generation process is carried out to generate appropriate gradation correction data. Specifically, the gradation correction data generation process is carried out in accordance with the flowchart shown in FIG. 15.

Figure 15:
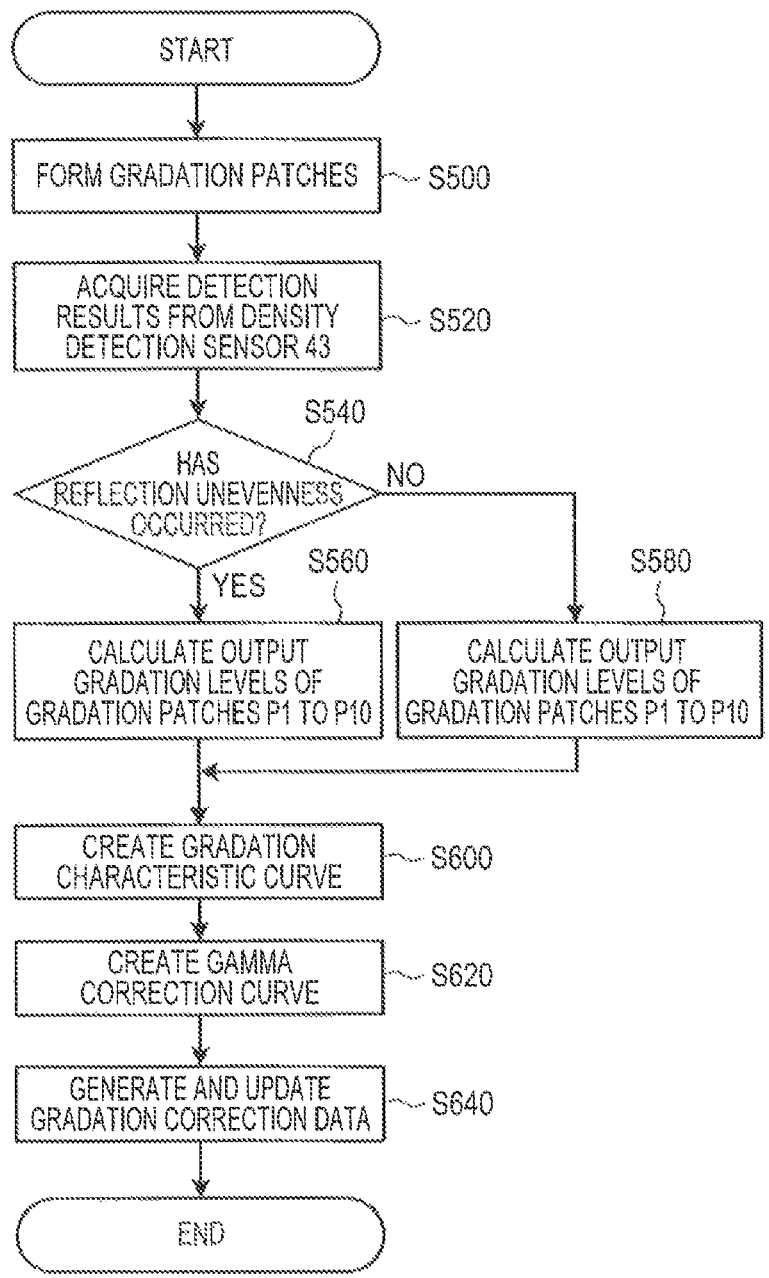
FIG. 15 is a flowchart showing an example of gradation correction in an image forming apparatus representing Embodiment 2 according to the present invention.

The gradation correction data generation process shown in FIG. 15 is, for example, carried out by CPU 11 that executes a predetermined program stored in ROM 12 after image forming apparatus 5 is powered on. Further, the gradation correction data generation process is desirably carried out on a regular basis, for example, when a predetermined period has elapsed after the preceding gradation correction data generation process was carried out, when a predetermined number of images have been formed, or when the apparatus returns from a sleep mode.

Control section 10 first controls image forming section to form gradation patches P1 to P10 in first region 500 on intermediate transfer belt 421 (step S500). Image data on gradation patches P1 to P10 are stored, for example, in ROM 12. Image forming section 40 forms no gradation patch in second region 510, unlike Embodiment 1. That is, the base surface having the minimum density in intermediate transfer belt 421 is used as reference patches P21 to P30 that form second region 510.

Control section 10 then acquires detection results on gradation patches P1 to P10 and reference patches P21 to P30 from density detection sensor 43 (step S520). The acquired detection results are temporarily stored in RAM 13. Grayscale patches P1 to P10 and reference patches P21 to P30 formed on intermediate transfer belt 421 pass through a region where density detection sensor 43 performs density detection. These patches are then removed by belt cleaning device 426.

Control section 10 then determines whether or not reflection unevenness has occurred in the sub-scanning direction of intermediate transfer belt 421 based on the reflection densities of reference patches P21 to P30 (step S540). For example, control section 10 averages the reflection densities of reference patches P21 to P30, and when any one of the reference patches shows a reflection density that deviates from the calculated average by a predetermined value or more, control section 10 determines that reflection unevenness has occurred.

When control section 10 determines that reflection unevenness has occurred (YES in step S540), control section 10 calculates output gradation levels of gradation patches P1 to P10 based on the detection results obtained in step S520 (step S560). Specifically, control section 10 uses reflection densities CP(n+20) (CP21 to CP30) of reference patches P21 to P30 to perform 8-bit normalization on reflection densities CPn (CP1 to CP10) of gradation patches P1 to P10 in accordance with Equation (5) below. The output gradation levels are thereby calculated so as to cancel the effect of reflection unevenness so that the normalized reflection density of gradation patch P10 (black solid portion) is 0 and the normalized reflection density of gradation patch P1 (white solid portion) is 255.

$$\text{Output gradation level} = \{(CPn - CP10)/(CP(n+20) - CP10)\} \times 255 \quad (5)$$

For example, the output gradation level of gradation patch P5 is calculated through 8-bit normalization on reflection density CP5 of gradation patch P5 in accordance with the following Equation (6):

$$\text{Output gradation level} = \{(CP5 - CP10)/(CP25 - CP10)\} \times 255 \quad (6)$$

The output gradation level of gradation patch P8 is calculated through 8-bit normalization on reflection density CP8 of gradation patch P8 in accordance with the following Equation (7).

$$\text{Output gradation level} = \{(CP8 - CP10)/(CP28 - CP10)\} \times 255 \quad (7)$$

As described above, an output gradation level of each of gradation patches P1 to P10 is calculated using the reflection density of the reference patch located in the same position as the gradation patch to be calculated in the sub-scanning direction of intermediate transfer belt 421. This is because when reflection unevenness has occurred, a gradation patch and a reference patch located in the same position in the sub-scanning direction of intermediate transfer belt 421 are believed to be identically affected by the reflection unevenness. Output gradation levels of gradation patches P1 to P10 are calculated by commonly using reflection density CP10 of gradation patch P10. This is because gradation patch P10 having the maximum density is hardly affected by reflection unevenness.

On the other hand, when it is determined that no reflection unevenness has occurred (NO in step S540), control section 10 calculates the output gradation levels of gradation patches P1 to P10 based on the detection results obtained in step S520 (step S580). Specifically, control section 10 refers to a conversion table for converting a reflection density into an output gradation level, and thereby calculates output gradation levels of gradation patches P1 to P10 from reflection densities CPn (CP1 to CP10) of gradation patches P1 to P10. The conversion table is stored, for example, in ROM 12.

In step S600, control section 10 relates the input gradation levels of gradation patches P1 to P10 to the output gradation levels calculated in step S560 or S580 to create a gradation characteristic curve. The gradation characteristic curve is, for example, expressed by curve L1 shown in FIG. 13. The processes in subsequent steps S620 and S640 are the same as those in steps S240 and S260 described in Embodiment 1, and no description thereof will therefore be made.

As described above in detail, in Embodiment 2, a plurality of gradation patches P1 to P10 having different densities are formed in first region 500, and reference patches P21 to P30 are formed in second region 510 along the sub-scanning direction of intermediate transfer belt 421. Density detection sensor 43 detects the reflection densities of gradation patches P1 to P10 located in first region 500 and the reflection densities of reference patches P21 to P30 located in second region 510. The output gradation levels of gradation patches P1 to P10 calculated from the reflection densities of gradation patches P1 to P10 are then corrected based on the reflection densities of reference patches P21 to P30, and the gradation characteristic of image forming section 40 is acquired from the corrected output gradation levels and the input gradation levels of gradation patches P1 to P10. Based on the acquired gradation characteristic, gradation correction data are generated.

According to thus configured Embodiment 2, when reflection unevenness occurs in the sub-scanning direction of intermediate transfer belt 421, the reflection densities of reference patches P21 to P30, which tend to be affected by reflection unevenness, can be used to cancel the effect of the reflection unevenness that varies across gradation patches P1 to P10. Output gradation levels of gradation patches P1 to P10 can thus be accurately calculated. The resultant gradation characteristic is close to a gradation characteristic derived from detection results obtained when no reflection unevenness occurs. Appropriate image stabilization control can therefore be performed through gradation correction based on the resultant gradation characteristic.

Embodiment 2 has been described with reference to the case where reference patches P21 to P30 have the minimum density, but they may alternatively have an intermediate density. However, to calculate output gradation levels of gradation patches P1 to P10 so as to effectively cancel the effect of reflection unevenness, reference patches P21 to P30 desirably have the minimum density, which tends to be most affected by reflection unevenness.

In Embodiment 2 described above, reference patches P21 to P30 are not necessarily disposed as shown in Embodiment 2. Essentially, gradation patches P1 to P10 only need to be in the same positions as those of reference patches P21 to P30, respectively, in the sub-scanning direction of intermediate transfer belt 421.

Embodiment 2 has been described with reference to the case where output gradation levels of gradation patches P1 to P10 are calculated based on the reflection densities of gradation patches P1 to P10 and the reflection densities of reference patches P21 to P30 only when it is determined that reflection unevenness has occurred, but the present invention is not limited thereto. For example, even when it is determined that no reflection unevenness has occurred, the output gradation levels may be calculated in accordance with Equation (5) described above based on the reflection densities of gradation patches P1 to P10 and the reflection densities of reference patches P21 to P30.

<Embodiment 3>

In Embodiment 3, a gradation correction method suitable for the case of occurrence of at least one of image unevenness and reflection unevenness occurs in the sub-scanning direction of intermediate transfer belt 421 will be disclosed. The basic configuration of image forming apparatus 5 is the same as those in Embodiment 1 and Embodiment 2, and no description thereof will therefore be made.

Figures 16A, 16B:
FIG. 16A shows the configuration of a patch band used in Embodiment 3 according to the present invention.
FIG. 16B shows the configuration of another patch band used in Embodiment 3 according to the present invention.

FIGS. 16A and 16B show the configuration of patch bands used in Embodiment 3. Image forming section 40 forms ten gradation patches P1 to P10 in first region 500 shown in FIG. 5 continuously along the sub-scanning direction of intermediate transfer belt 421, as shown in FIG. 16A. Grayscale patches P1 to P10 are the same as those described in Embodiment 1, and no description thereof will therefore be made.

Ten reference patches P31 to P40 are formed in second region 510 along the sub-scanning direction of intermediate transfer belt 421, as shown in FIG. 16B. Reference patches P31 to P40 are used for determining whether or not at least one of image unevenness and reflection unevenness has occurred in the sub-scanning direction of intermediate transfer belt 421. Each of patches P31 to P40 has a region where image forming section 40 forms a black solid image having the maximum density (hereinafter referred to as "maximum density region") and a region where image forming section 40 forms no toner image (hereinafter referred to as "minimum density region"). In the present embodiment, the minimum density region is a region of the base surface having the minimum density in intermediate transfer belt 421. When it is determined that at least one of image unevenness and reflection unevenness has occurred, reference patches P31 to P40 along with gradation patches P1 to P10 are used to generate gradation correction data.

Density detection sensor 43 detects the reflection densities of the maximum density regions and the minimum density regions in reference patches P31 to P40 sequentially from first reference patch P40.

It can be determined whether or not image unevenness has occurred in the sub-scanning direction of intermediate transfer belt 421 based on the reflection densities of the maximum density regions in reference patches P31 to P40. This is because when no image unevenness occurs, the reflection densities of the maximum density regions in reference patches P31 to P40 are substantially the same, whereas when image unevenness occurs, the reflection densities of the maximum density regions in reference patches P31 to P40 greatly vary. A high-density image particularly tends to be affected by image unevenness. Thus, a black solid image having the maximum density is used as the maximum density region of each of reference patches P31 to P40 in the present embodiment. Whether or not image unevenness has occurred can therefore be readily determined.

It can be further determined whether or not reflection unevenness has occurred in the sub-scanning direction of intermediate transfer belt 421 based on the reflection densities of the minimum density regions in reference patches P31 to P40. This is because when no reflection unevenness occurs, the reflection densities of the minimum density regions in reference patches P31 to P40 are substantially the same, whereas when reflection unevenness occurs, the reflection densities of the minimum density regions in reference patches P31 to P40 greatly vary. A low-density image particularly tends to be affected by reflection unevenness. The base surface having the minimum density in intermediate transfer belt 421 is thus used as the minimum density regions of reference patches P31 to P40 in the present embodiment. Whether or not reflection unevenness has occurred in the sub-scanning direction of intermediate transfer belt 421 can therefore be readily determined.

When at least one of image unevenness and reflection unevenness has occurred in the sub-scanning direction of intermediate transfer belt 421, the gradation characteristic of image forming section 40 derived from detection results on gradation patches P1 to P10 differs from a gradation characteristic derived from detection results obtained when no image unevenness or reflection unevenness occurs, and hence cannot be said to be an accurate gradation characteristic. Grayscale correction based on the thus derived gradation characteristic will not provide appropriate image stabilization control.

To address the problem, in the present embodiment, when at least one of image unevenness and reflection unevenness occurs, not only detection results on gradation patches P1 to P10 from density detection sensor 43 but also detection results on reference patches P31 to P40 from density detection sensor 43 are used to acquire an accurate gradation characteristic of image forming section 40, and then a gradation correction data generation process is carried out to generate appropriate gradation correction data. Specifically, the gradation correction data generation process is carried out in accordance with the flowchart shown in FIG. 17.

Figure 17:
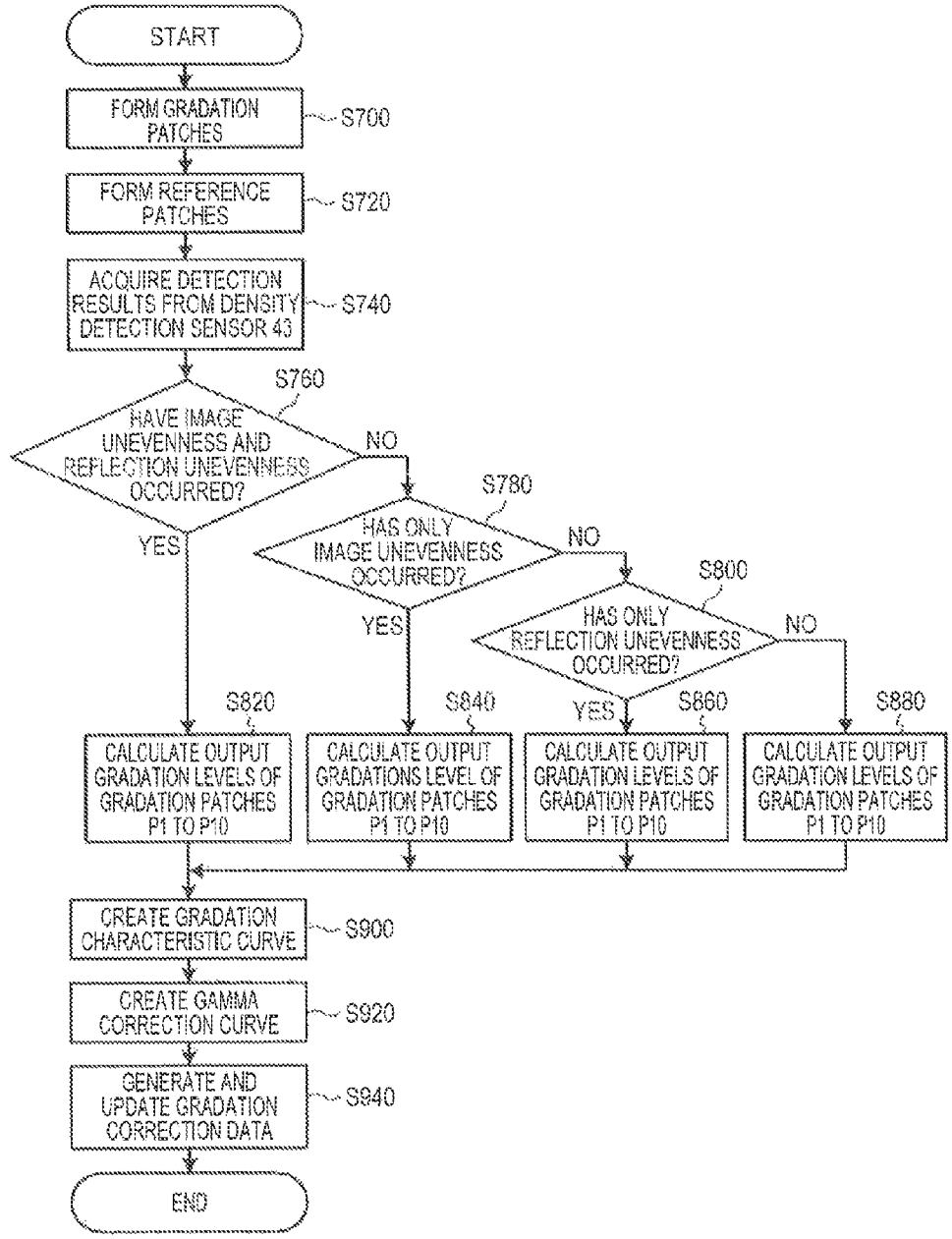
FIG. 17 is a flowchart showing an example of gradation correction in an image forming apparatus representing Embodiment 3 according to the present invention.

The gradation correction data generation process shown in FIG. 17 is, for example, carried out by CPU 11 that executes a predetermined program stored in ROM 12 after image forming apparatus 5 is powered on. Further, the gradation correction data generation process is desirably carried out on a regular basis, for example, when a predetermined period has elapsed after the preceding gradation correction data generation process was carried out, when a predetermined number of images have been formed, or when the apparatus returns from a sleep mode.

Control section 10 first controls image forming section to form gradation patches P1 to P10 in first region 500 on intermediate transfer belt 421 (step S700). Image data on gradation patches P1 to P10 are stored, for example, in ROM 12.

Control section 10 then controls image forming section 40 to form reference patches P31 to P40 in second region 510 on intermediate transfer belt 421 (step S720). Image data on reference patches P31 to P40 are stored, for example, in ROM 12.

Control section 10 then acquires detection results on gradation patches P1 to P10 and reference patches P31 to P40 from density detection sensor 43 (step S740). The acquired detection results are temporarily stored in RAM 13. Gray-scale patches P1 to P10 and reference patches P31 to P40 formed on intermediate transfer belt 421 pass through a region where density detection sensor 43 performs density detection. These patches are then removed by belt cleaning device 426.

Control section 10 then determines whether or not both image unevenness and reflection unevenness have occurred in the sub-scanning direction of intermediate transfer belt 421 based on the reflection densities of reference patches P31 to P40 (step S760). For example, control section 10 averages the reflection densities of the maximum density regions in reference patches P31 to P40, and when any one of the reference patches shows a reflection density that deviates from the calculated average by a predetermined value or more, control section 10 determines that image unevenness has occurred. Control section 10 further averages the reflection densities of the minimum density regions in reference patches P31 to P40, and when any one of the reference patches shows a reflection density that deviates from the calculated average by a predetermined value, control section determines that reflection unevenness has occurred.

When control section 10 determines that both image unevenness and reflection unevenness have occurred (YES in step S760), control section 10 calculates output gradation levels of gradation patches P1 to P10 based on the detection results obtained in step S740 (step S820). Specifically, control section 10 uses reflection densities CPB(n+30) (CPB31 to CPB40) of the maximum density regions and reflection densities CPC(n+30) (CPC31 to CPC40) of the minimum density regions of reference patches P31 to P40 to perform 8-bit normalization on reflection densities CPn (CP1 to CP10) of gradation patches P1 to P10 in accordance with Equation (9) below. The output gradation levels are thereby calculated so that the normalized reflection density of gradation patch P10 (black solid portion) is 0 and the normalized reflection density of gradation patch P1 (white solid portion) is 255.

$$\text{Output gradation level} = \{(CPn - CPB(n+30))/(CPC(n+30) - CPB(n+30))\} \times 255 \tag{9}$$

For example, the output gradation level of patch P5 is calculated through 8-bit normalization on reflection density CP5 of patch P5 in accordance with the following Equation (91):

$$\text{Output gradation level} = \{(CP5 - CPB35)/(CPC35 - CPB35)\} \times 255 \tag{91}$$

The output gradation level of patch P8 is calculated through 8-bit normalization on reflection density CP8 of patch P8 in accordance with the following Equation (92):

$$\text{Output gradation level} = \{(CP8 - CPB38)/(CPC38 - CPB38)\} \times 255 \tag{92}$$

As described above, an output gradation level of each of patches P1 to P10 is calculated using the reflection density of the reference patch located in the same position as the gradation patch to be calculated in the sub-scanning direction of intermediate transfer belt 421. This is because when image unevenness and reflection unevenness have occurred, a gradation patch and a reference patch located in the same position in the sub-scanning direction of intermediate transfer belt 421 are believed to be identically affected by the image unevenness and the reflection unevenness.

On the other hand, when it is determined that no image unevenness and reflection unevenness have occurred (NO in step S760), control section 10 determines whether or not only image unevenness has occurred (step S780). When control section 10 determines that only image unevenness has occurred (YES in step S780), control section 10 calculates output gradation levels of gradation patches P1 to P10 based on the detection results obtained in step S740 (step S840). Specifically, control section uses reflection densities CPB(n+30) (CPB31 to CPB40) of the maximum density regions in reference patches P31 to P40 to perform 8-bit normalization on reflection densities CPn (CP1 to CP10) of gradation patches P1 to P10 in accordance with Equation (10) below. The output gradation levels are thereby calculated so that the normalized reflection density of gradation patch P10 is 0 and the normalized reflection density of gradation patch P1 is 255.

$$\text{Output gradation level} = \{(CPn - CPB(n+30))/(CP1 - CPB(n+30))\} \times 255 \tag{10}$$

For example, the output gradation level of patch P5 is calculated through 8-bit normalization on reflection density CP5 of patch P5 in accordance with the following Equation (101):

$$\text{Output gradation level} = \{(CP5 - CPB35)/(CP1 - CPB35)\} \times 255 \tag{101}$$

The output gradation level of patch P8 is calculated through 8-bit normalization on reflection density CP8 of patch P8 in accordance with the following Equation (102):

$$\text{Output gradation level} = \{(CP8 - CPB38)/(CP1 - CPB38)\} \times 255 \tag{102}$$

As described above, an output gradation level of each of patches P1 to P10 is calculated using the reflection density of the reference patch located in the same position as the gradation patch to be calculated in the sub-scanning direction of intermediate transfer belt 421. This is because when image unevenness has occurred, a gradation patch and a reference patch located in the same position in the sub-scanning direction of intermediate transfer belt 421 are believed to be identically affected by the image unevenness. Output gradation levels of patches P1 to P10 are calculated by commonly using reflection density CP1 of patch P1. This is because patch P1 having the minimum density is hardly affected by image unevenness.

On the other hand, when it is determined that only image unevenness has not occurred (NO in step S780), control section 10 determines whether or not only reflection unevenness has occurred (step S800). When control section 10 determines that only reflection unevenness has occurred (YES in step S800), control section 10 calculates output gradation levels of patches P1 to P10 based on the detection results obtained in step S740 (step S860). Specifically, control section 10 uses reflection densities CPC(n+30) (CPC31 to CPC40) of the minimum density regions in reference patches P31 to P40 to perform 8-bit normalization on reflection densities CPn (CP1 to CP10) of patches P1 to P10 in accordance with Equation (11) below. The output gradation levels are thereby calculated so that the normalized reflection density of patch P10 is 0 and the normalized reflection density of patch P1 is 255.

$$\text{Output gradation level} = \{(CPn - CP10)/(CPC(n+30) - CP10)\} \times 255 \tag{11}$$

For example, the output gradation level of patch P5 is calculated through 8-bit normalization on reflection density CP5 of patch P5 in accordance with the following Equation (111):

$$\text{Output gradation level} = \{(CP5-CP10)/(CPC35-CP10)\} \times 255 \quad (111)$$

The output gradation level of patch P8 is calculated through 8-bit normalization on reflection density CP8 of patch P8 to in accordance with the following Equation (112):

$$\text{Output gradation level} = \{(CP8-CP10)/(CPC38-CP10)\} \times 255 \quad (112)$$

As described above, an output gradation level of each of patches P1 to P10 is calculated using the reflection density of the reference patch located in the same position as the gradation patch to be calculated in the sub-scanning direction of intermediate transfer belt 421. This is because when reflection unevenness has occurred, a gradation patch and a reference patch located in the same position in the sub-scanning direction of intermediate transfer belt 421 are believed to be identically affected by the reflection unevenness. Output gradation levels of patches P1 to P10 are calculated by commonly using reflection density CP10 of patch P10. This is because patch P10 having the maximum density is hardly affected by reflection unevenness.

On the other hand, when it is determined that only reflection unevenness has not occurred (NO in step S800), control section 10 calculates output gradation levels of patches P1 to P10 based on the detection results obtained in step S740 (step S880). Specifically, control section 10 refers to a conversion table for converting a reflection density into an output gradation level, and thereby calculates output gradation levels of patches P1 to P10 from reflection densities CPn (CP1 to CP10) of patches P1 to P10. The conversion table is stored, for example, in ROM 12.

In step S900, control section 10 relates the input gradation levels of patches P1 to P10 to the output gradation levels calculated in any of steps S820 to S880 to create a gradation characteristic curve. The gradation characteristic curve is, for example, expressed by curve L1 shown in FIG. 13. The processes in subsequent steps S920 and S940 are the same as those in steps S240 and S260 described in Embodiment 1, and no description thereof will therefore be made.

As described above in detail, in Embodiment 3, a patch band formed of a plurality of patches P1 to P10 having different densities is formed in first region 500 and reference patches P31 to P40 are formed in second region 510 along the sub-scanning direction of intermediate transfer belt 421. Density detection sensor 43 detects the reflection densities of patches P1 to P10 located in first region 500 and the reflection densities of reference patches P31 to P40 located in second region 510. The output gradation levels of patches P1 to P10 calculated from the reflection densities of patches P1 to P10 are then corrected based on the reflection densities of reference patches P31 to P40, and the gradation characteristic is acquired from the corrected output gradation levels and the input gradation levels of patches P1 to P10 to generate gradation correction data based on the acquired gradation characteristic.

According to thus configured Embodiment 3, when at least one of image unevenness and reflection unevenness has occurred in the sub-scanning direction of intermediate transfer belt 421, the reflection densities of reference patches P31 to P40, which tend to be affected by image unevenness and reflection unevenness, can be used to cancel the effect of the image unevenness and the reflection unevenness that vary across gradation patches P1 to P10. Output gradation levels of gradation patches P1 to P10 can thus be accurately calculated. The resultant gradation characteristic is close to a gradation characteristic derived from detection results obtained when no image unevenness or reflection unevenness has occurred. Appropriate image stabilization control can therefore be performed through gradation correction based on the resultant gradation characteristic.

Embodiment 3 has been described with reference to the case where the maximum density regions in reference patches P31 to P40 have the maximum density, but they may alternatively have an intermediate density. However, to calculate output gradation levels of gradation patches P1 to P10 so as to effectively cancel the effect of image unevenness, reference patches P31 to P40 desirably have the maximum density, which tends to be most affected by image unevenness.

Embodiment 3 has been described with reference to the case where the minimum density regions in reference patches P31 to P40 have the minimum density, but they may alternatively have an intermediate density. However, to calculate output gradation levels of patches P1 to P10 so as to effectively cancel the effect of reflection unevenness, reference patches P31 to P40 desirably have the minimum density, which tends to be most affected by reflection unevenness.

In Embodiment 3 described above, reference patches P31 to P40 are not necessarily disposed as shown in Embodiment 3. Essentially, patches P1 to P10 only need to be in the same positions as those of reference patches P31 to P40, respectively, in the sub-scanning direction of intermediate transfer belt 421.

In Embodiment 3 described above, the maximum density regions and the minimum density regions in reference patches P31 to P40 are not limited to those shown in Embodiment 3. Essentially, each of reference patches P31 to P40 only needs to have the maximum density region and the minimum density region.

Embodiment 3 has been described with reference to the case where output gradation levels of patches P1 to P10 are calculated based on the reflection densities of patches P1 to P10 and the reflection densities of reference patches P31 to P40 when it is determined that at least one of image unevenness and reflection unevenness has occurred, but the present invention is not limited thereto. For example, even when it is determined that neither image unevenness nor reflection unevenness has occurred, the output gradation levels may be calculated in accordance with any of Equations (9) to (11) described above based on the reflection densities of patches P1 to P10 and the reflection densities of reference patches P31 to P40.

Embodiment 3 has been described with reference to the case where output gradation levels of patches P1 to P10 are calculated in accordance with Equation (10) described above based on the reflection densities of patches P1 to P10 and the reflection densities of reference patches P31 to P40 when it is determined that only image unevenness has occurred, but the present invention is not limited thereto. For example, the output gradation levels may be calculated in accordance with Equation (9) described above based on the reflection densities of patches P1 to P10 and the reflection densities of reference patches P31 to P40.

Embodiment 3 has been described with reference to the case where output gradation levels of patches P1 to P10 are calculated in accordance with Equation (11) described above based on the reflection densities of patches P1 to P10 and the reflection densities of reference patches P31 to P40 when it is determined that only reflection unevenness has occurred, but the present invention is not limited thereto. For example, the output gradation levels may be calculated in accordance with Equation (9) described above based on the reflection densities of patches P1 to P10 and the reflection densities of reference patches P31 to P40.

Embodiments 1 to 3 have been described with reference to the case where first region 500 and second region 510 are located in the non-image forming regions of intermediate transfer belt 421, but the present invention is not limited thereto. For example, first region 500 and second region 510 may be located in the image forming region of intermediate transfer belt 421.

In Embodiments 1 to 3 described above, the number and the arrangement of gradation patches are not limited to those shown in Embodiments 1 to 3.

Embodiments 1 to 3 have been described with reference to the case where intermediate transfer belt 421 functions as the image bearing member in the present invention, but the present invention is not limited thereto. For example, the photoconductor or a sheet may alternatively function as the image bearing member. Further, the present invention is also applicable to a monochrome image forming apparatus that forms a monochrome image.

<Embodiment 4>

The configuration of patch bands according to Embodiment 4 will next be described in detail.

[1] Example 1 of Configuration of Patch Bands

Figure 18:
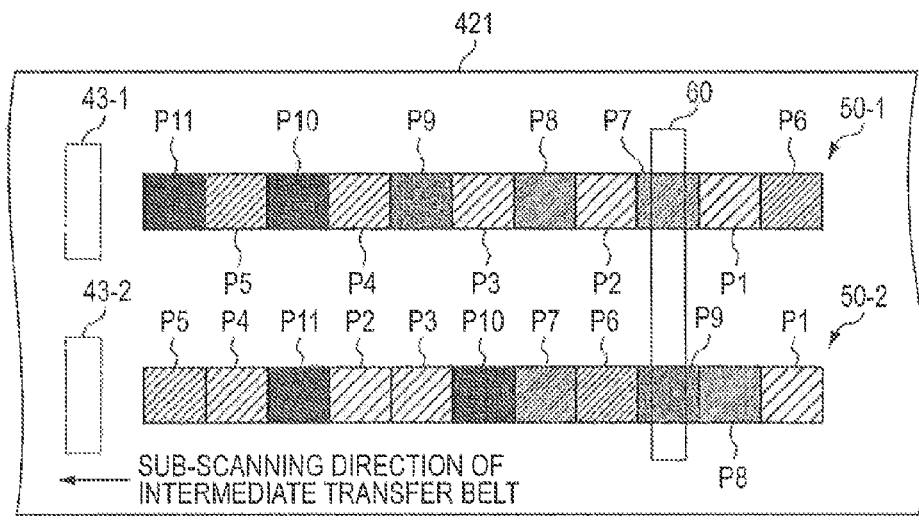
FIG. 18 shows Example 1 of the configuration of patch bands according to Embodiment 4.

FIG. 18 shows Example 1 of the configuration of patch bands. Patch bands 50-1 and 50-2 are disposed in parallel to each other, as shown in FIG. 18. Each of patch bands 50-1 and 50-2 is formed of a plurality of gradation patches P1 to P11 having different gradation levels.

In each of patch bands 50-1 and 50-2, gradation patches P1 to P11 are so arranged that the gradation levels thereof run in the sub-scanning direction (also referred to as "gradation patch disposing direction"). In other words, each of patch bands 50-1 and 50-2 is so configured that the gradation levels thereof are randomly arranged in the sub-scanning direction.

When intermediate transfer belt 421 moves in the sub-scanning direction as indicated by the arrow, density detection sensors 43-1 and 43-2 detect the densities of patch bands 50-1 and 50-2 from left to right.

Consider now a case where scratch 60 is present in the main scanning direction (also referred to as "width direction") of intermediate transfer belt 421. Even in the case described above, since the gradation levels of gradation patches P7 and P9 where scratch 60 is located differ from each other, it is possible to prevent scratch 60 from affecting both gradation patches having a certain gradation level in patch bands 50-1 and 50-2. That is, even when scratch 60 adversely affects gradation patch P7 in patch band 50-1, scratch 60 does not adversely affect gradation patch P7 in patch band 50-2, therefore enabling detection of a correct density of gradation patch P7. Similarly, even when scratch 60 adversely affects gradation patch P9 in patch band 50-2, scratch 60 does not adversely affect gradation patch P9 in patch band 50-1, therefore enabling detection of a correct density of gradation patch P9.

Since the gradation levels of gradation patches P7 and P9, where scratch 60 is present, differ from each other, scratch 60 affects the gradation patches P7 and P9 differently, therefore enabling employment of the detected density of gradation patch P7 or P9 that is less affected by scratch 60. H-low to employ a less affected detected density will be described later in detail.

Patch bands 50-1 and 50-2 shown in FIG. 18 are characterized as follows:

(i) Patch bands 50-1 and 50-2 are disposed in parallel to each other so that the gradation patches in patch band 50-1 coincide with the corresponding gradation patches in patch band 50-2 in the main scanning direction of intermediate transfer belt 421. This shortens the density detection period.

(ii) In each of patch bands 50-1 and 50-2, the patches are disposed so that their gradation levels run in the sub-scanning direction (also referred to as "gradation patch disposing direction"). Thereby, even when a density affecting factor, such as a scratch, is present in the main scanning direction, a gradation patch that is not affected at all or is not greatly affected by the density affecting factor is more likely to be present. This can limit a decrease in density detection accuracy.

[2] Example 2 of Configuration of Patch Bands

Figure 19:
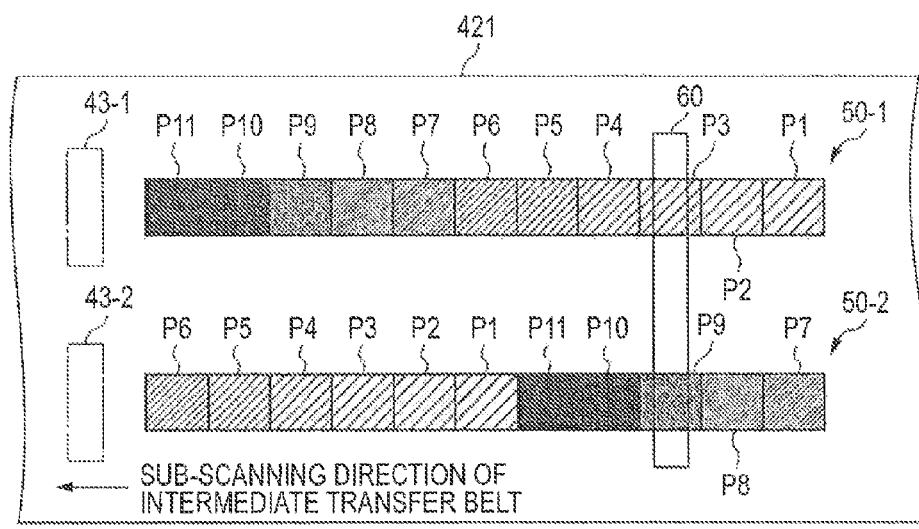
FIG. 19 shows Example 2 of the configuration of patch bands according to Embodiment 4.

FIG. 19 shows Example 2 of the configuration of patch bands.

Patch bands 50-1 and 50-2 shown in FIG. 19 are characterized as follows:

(i) Patch bands 50-1 and 50-2 are disposed in parallel to each other so that the gradation patches in patch band 50-1 coincide with the corresponding gradation patches in patch band 50-2 in the main scanning direction of intermediate transfer belt 421. This shortens the density detection period.

(ii) Patch band 50-1 is so patterned that the gradation level thereof gradually decreases. Patch band 50-1 may alternatively be so patterned that the gradation level thereof gradually increases. Patch band 50-2 is a pattern produced by interchanging the former half and the latter half of the patches separated at a substantially central position of patch band 50-1. Thereby, even when scratch 60 is present in the main scanning direction of intermediate transfer belt 421, it is possible to prevent the scratch from affecting both gradation patches having a certain gradation level in patch bands 50-1 and 50-2. As a result, a decrease in density detection accuracy can be limited.

[3] Example 3 of Configuration of Patch Bands

Figure 20:
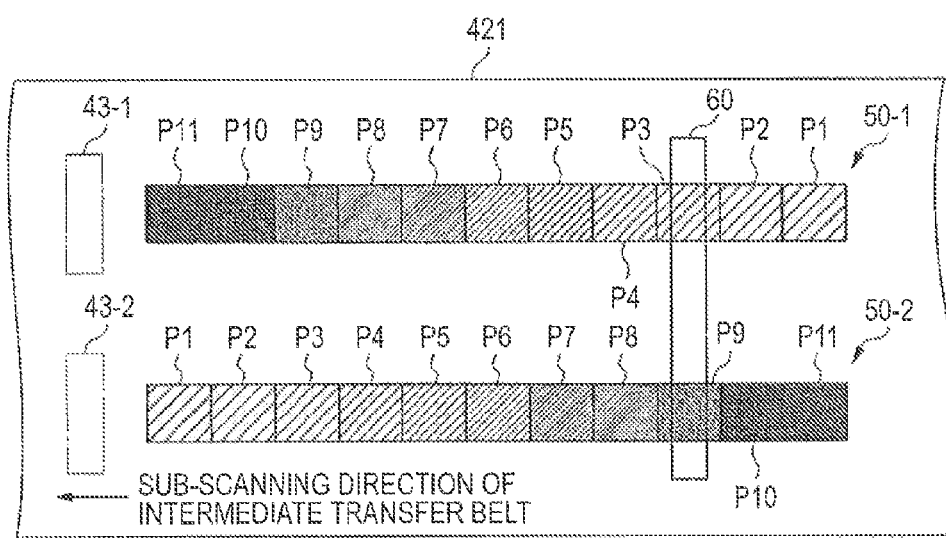
FIG. 20 shows Example 3 of the configuration of patch bands according to Embodiment 4.

Patch bands 50-1 and 50-2 shown in FIG. 20 are characterized as follows:

(i) Patch bands 50-1 and 50-2 are disposed in parallel to each other so that the gradation patches in patch band 50-1 coincide with the corresponding gradation patches in patch band 50-2 in the main scanning direction of intermediate transfer belt 421. This shortens the density detection period.

(ii) Patch band 50-1 is so patterned that the gradation level thereof gradually decreases, whereas patch band 50-2 is conversely so patterned that the gradation level thereof gradually increases. Patch band 50-1 may alternatively be so patterned that the gradation level thereof gradually increases, whereas patch band 50-2 may be so patterned that the gradation level thereof gradually decreases. Thereby, even when scratch 60 is present in the main scanning direction of intermediate transfer belt 421, it is possible to prevent the scratch from affecting both gradation patches having a certain gradation level in patch bands 50-1 and 50-2. As a result, a decrease in density detection accuracy can be limited.

[4] Example 4 of Configuration of Patch Bands

Figure 21:
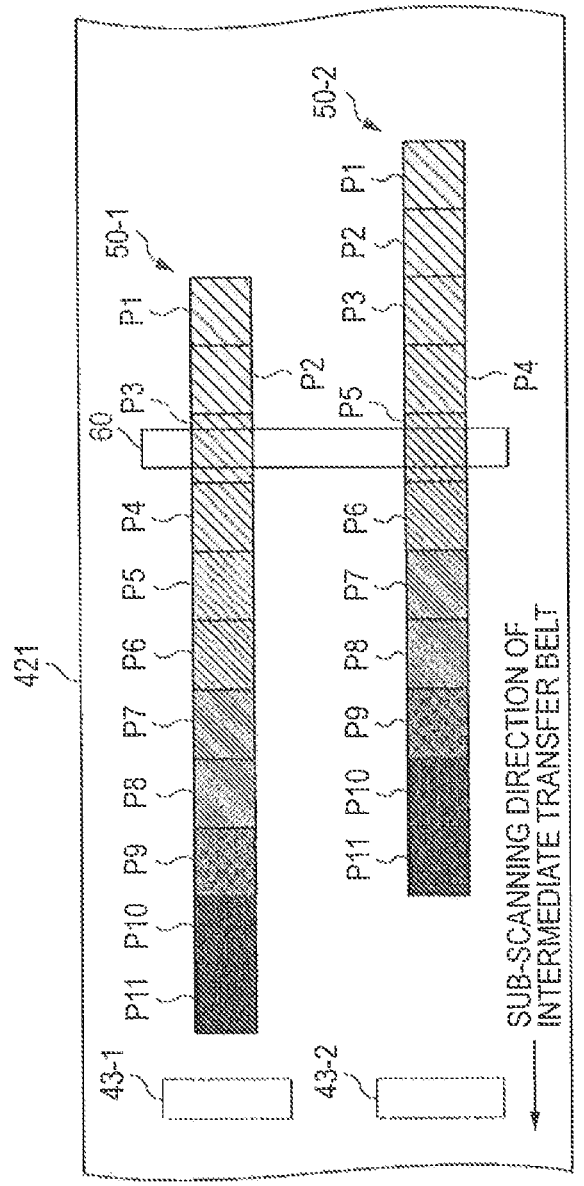
FIG. 21 shows Example 4 of the configuration of patch bands according to Embodiment 4.

FIG. 21 shows Example 4 of the configuration of patch bands.

Patch bands 50-1 and 50-2 shown in FIG. 21 are characterized as follows:

(i) Patch bands 50-1 and 50-2 have the same gradation pattern. That is, gradation patches P1 to P11 are disposed in the same order in patch bands 50-1 and 50-2.

(ii) Patch bands 50-1 and 50-2 are shifted from each other in the sub-scanning direction so as to partially overlap with each other in the sub-scanning direction. The arrangement described above allows the density detection period to be shortened by time corresponding to the amount of overlap. Since patch bands 50-1 and 50-2 are shifted from each other in the sub-scanning direction, the gradation levels of gradation patches that overlap with each other in the main scanning direction, which is perpendicular to the sub-scanning direction, differ from each other. Thereby, even when scratch 60 is present in the main scanning direction of intermediate transfer belt 421, it is possible to prevent the scratch from affecting both gradation patches having a certain gradation level in patch bands 50-1 and 50-2. As a result, a decrease in density detection accuracy can be limited.

(Density Detection in Embodiment 4)

Density detection in Embodiment 4 will next be described. In the present embodiment, three exemplary density detection processes are presented.

[1] Example 1 of Density Detection

Figure 22:
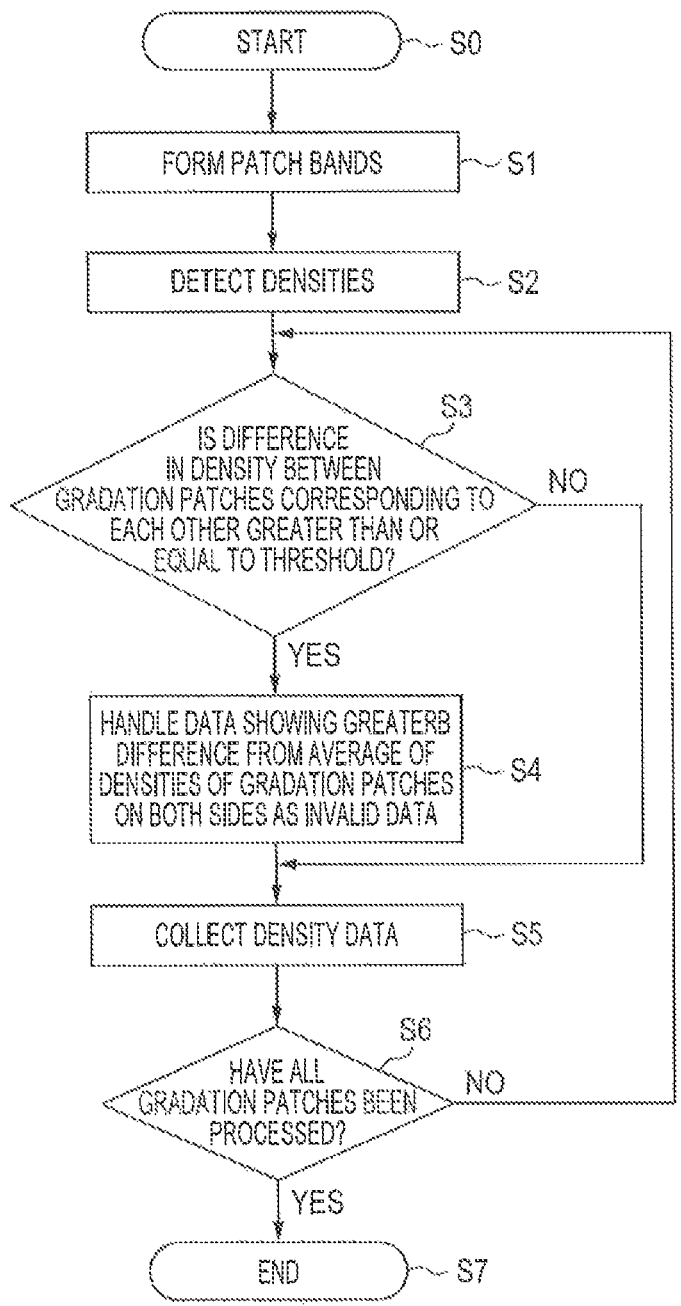
FIG. 22 is a flowchart for describing Example 1 of density detection in Embodiment 4.

FIG. 22 is a flowchart for describing Example 1 of the density detection.

At the timing when the gradation correction is performed (that is, when the apparatus is powered on, when the apparatus returns from a sleep mode, when a predetermine number of sheets have been printed, or when the external environment has been greatly changed), control section 10 of image forming apparatus 5 starts the process at step S0 and forms patch bands 50-1 and 50-2 on intermediate transfer belt 421 in subsequent step S1. In subsequent step S2, density detection sensors 43-1 and 43-2 detect the densities of patch bands 50-1 and 50-2.

Example 1 of the density detection shown in FIG. 22 is applicable to any of the arrangements shown in FIGS. 18 to 21. The following description will be made with reference to a case where Example 1 is applied to the arrangement shown in FIG. 18.

Control section 10 determines in step S3 whether or not the difference in density between gradation patches corresponding to each other is greater than or equal to a threshold. That is, the densities of gradation patches P1 to P11 detected by density detection sensor 43-1 are compared with the densities of gradation patches P1 to P11 detected by density detection sensor 43-2, and it is determined whether or not the difference in density between corresponding gradation patches having the same gradation level is greater than or equal to the threshold.

When step S3 provides a positive result, control section proceeds to step S4, whereas when step S3 provides a negative result, control section 10 proceeds to step S5.

In step S4, control section 10 averages the densities of gradation patches on both sides of a gradation patch of interest and handles as invalid data the detected density of the gradation patch of interest showing a greater difference from the average. In step S5, the density data are collected (that is, stored in a memory). In step S6, it is determined whether or not all the gradation patches have been processed. When it is determined that all the gradation patches have been processed, the control proceeds to step S7, whereas when it is determined that all the gradation patches have not been processed, the control returns to step S3.

The processes in steps S3 and S4 will now be specifically described with reference to FIG. 18.

Among gradation patches other than gradation patches P7 and P9 where scratch 60 is present, since the density of a gradation patch detected by density detection sensor 43-1 is substantially the same as the density of the corresponding gradation patch detected by density detection sensor 43-2, the result in step S3 is negative. In contrast, the density of gradation patch P7 detected by density detection sensor 43-1 and the density of gradation patch P7 detected by density detection sensor 43-2 show a density difference greater than or equal to a threshold because the scratch affects the detection result on gradation patch P7 from density detection sensor 43-1. In this case, the result in step S3 is positive. The same holds true for gradation patch P9.

The data on the densities of gradation patches P7 and P9 where scratch 60 is present are then processed in step S4. In step S4, the densities of gradation patches on both sides of gradation patch P7, that is, the detected density of gradation patch P6 and the detected density of gradation patch P8, are averaged, and the detected density of gradation patch P7 is subtracted from the average. Further, the densities of gradation patches on both sides of gradation patch P9, that is, the detected density of gradation patch P8 and the detected density of gradation patch P10, are averaged, and the detected density of gradation patch P9 is subtracted from the average. Among the data on the densities of gradation patches P7 and the data on the densities of gradation patches P9, data showing a greater subtraction result (difference) is deleted as invalid data.

In other words, when the detected density of a first gradation patch contained in first patch band 50-1 and the detected density of a second gradation patch contained in second patch band 50-2 and having the same gradation level as that of the first gradation patch have a difference greater than or equal to a threshold, a detected density of a gradation patch having a greater difference from the average of the detected densities of gradation patches on both sides of the gradation patch is handled as invalid data, between the detected density of the first gradation patch and the detected density of the second gradation patch.

In this way, detected density data more affected by scratch 60 will not be used.

[4-2] Example 2 of Density Detection

Figure 23:
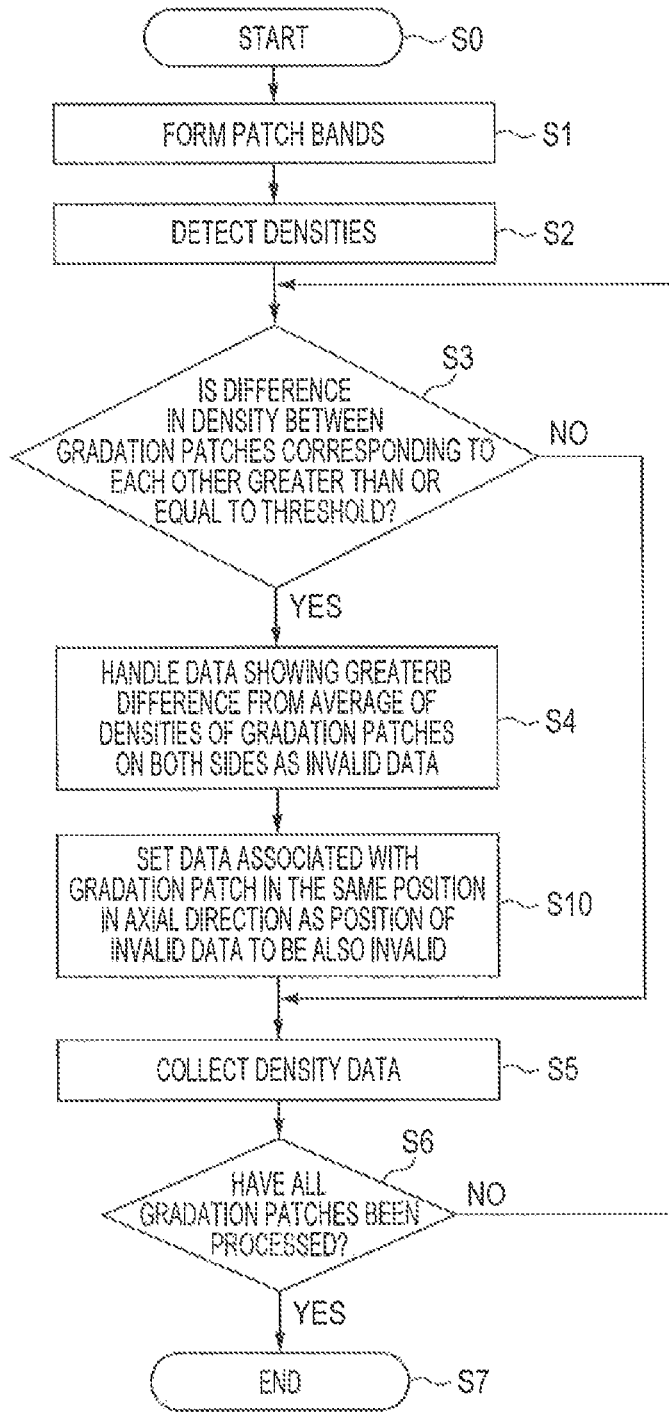
FIG. 23 is a flowchart for describing Example 2 of density detection in Embodiment 4.

FIG. 23, in which portions corresponding to those in FIG. 22 have the same reference characters, is a flowchart for describing Example 2 of the density detection.

In Example 2 shown in FIG. 23, step S10 is added after step S4, as compared with Example 1 shown in FIG. 22. In step S10, data associated with the gradation patch in the same position in the main scanning direction of intermediate transfer belt 421 as the position of the invalid data is also set to be invalid. In other words, step S10 also handles as invalid data the detected density of a gradation patch disposed at a position of coinciding with another gradation patch handled as invalid data in the main scanning direction. Specifically, when one of gradation patch P7 and gradation patch P9 is determined to provide invalid data, the data associated with the other one is also set to be invalid. In this way, the detected densities of patches containing scratch 60 or any other defect will not be used at all.

[3] Example 3 of Density Detection

Figure 24:
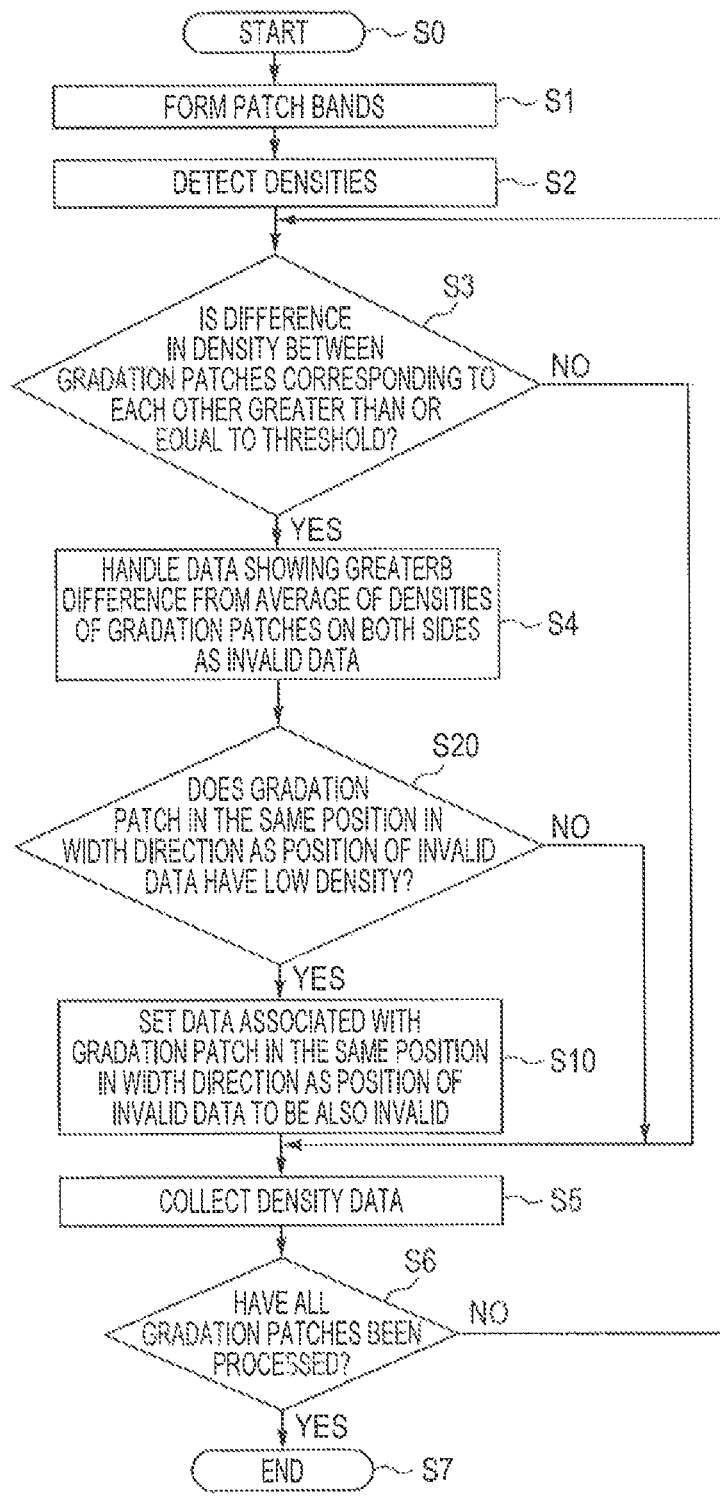
FIG. 24 is a flowchart for describing Example 3 of density detection in Embodiment 4.

FIG. 24, in which portions corresponding to those in FIG. 23 have the same reference characters, is a flowchart for describing Example 3 of the density detection.

In Example 3 of the density detection shown in FIG. 24, step S20 is added between step S4 and step S10, as compared with Example 2 the density detection shown in FIG. 23. In step S20, it is determined whether or not the gradation patch in the same position in the main scanning direction of intermediate transfer belt 421 as the position of the invalid data has a low density. When it is determined that the gradation patch has a low density, the control proceeds to step S10, whereas when it is determined that the gradation patch does not have a low density, the control proceeds to step S5.

It is known that the degree of the influence of scratch 60 or any other defect on a detected density increases as the density decreases. Thus, in the present example, a density threshold is set in advance, and when the detected density of the gradation patch is smaller than the threshold, the control proceeds to step S10, where the detected density is set to be invalid, whereas when the detected density of the gradation patch is greater than or equal to the threshold, the control proceeds to step S5, where the detected density is employed as density data. Essentially, when a gradation patch disposed at a position of coinciding with another gradation patch handled as the invalid data in the main scanning direction has a lower density than a predetermined density, the detected density of the thus disposed gradation patch is also handled as invalid data. It is therefore possible to accurately distinguish between detected density data greatly affected by scratch 60 or any other defect and hence set to be invalid, and detected density data less affected by scratch 60 or any other defect and employed as valid data.

As described above, according to Embodiment 4, patch bands 50-1 and 50-2 are configured to at least partially or entirely overlap with each other in the main scanning direction and include portions having gradation levels different from each other between patch bands 50-1 and 50-2 in the overlap portion. This can limit an increase in the density detection period, and also limit a decrease in the density detection accuracy due to scratch 60 or any other density affecting factor in the main scanning direction of the patch bands.

Figure 25:
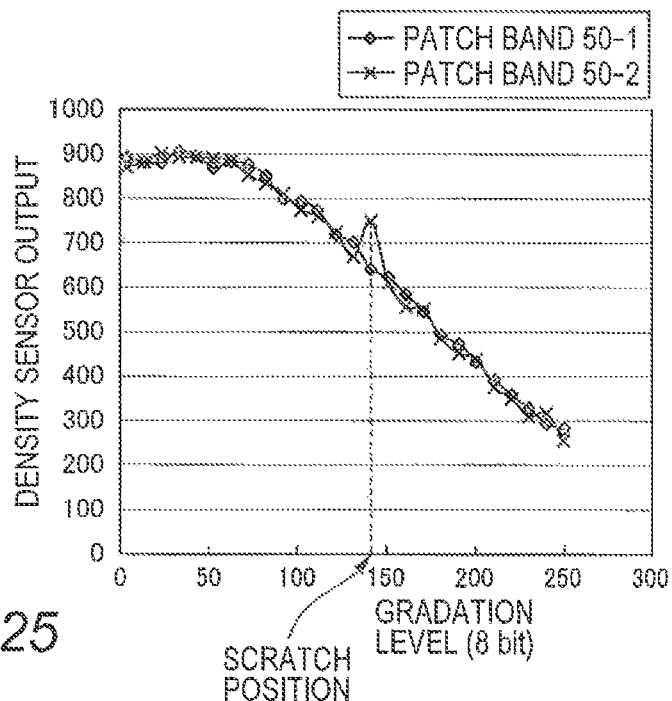
FIG. 25 shows output values from a density detection sensor that are provided in the configuration according to Embodiment 4.

FIG. 25 shows output values from density detection sensor 43 that are provided in the configuration according to the present embodiment. The detected density of a gradation patch where a scratch is present in patch band 50-2 has a wrong value. On the other hand, the detected density of the corresponding gradation patch in patch band 50-1 is not affected by the scratch and can therefore provide a correct detected density of the gradation patch, as shown in FIG. 25.

Figure 1:
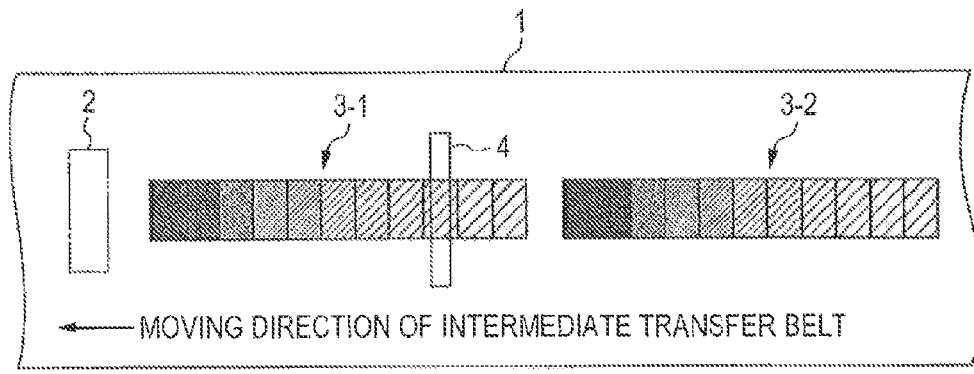
FIG. 1 shows related art in which the same gradation pattern images are disposed in series with each other.
Figure 2:
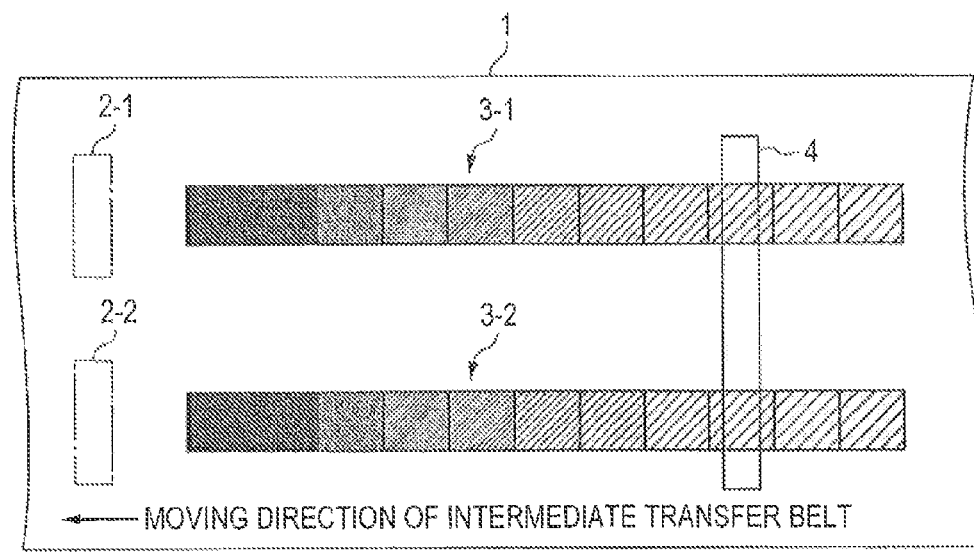
FIG. 2 shows related art in which the same gradation pattern images are disposed in parallel to each other.
Figure 26:
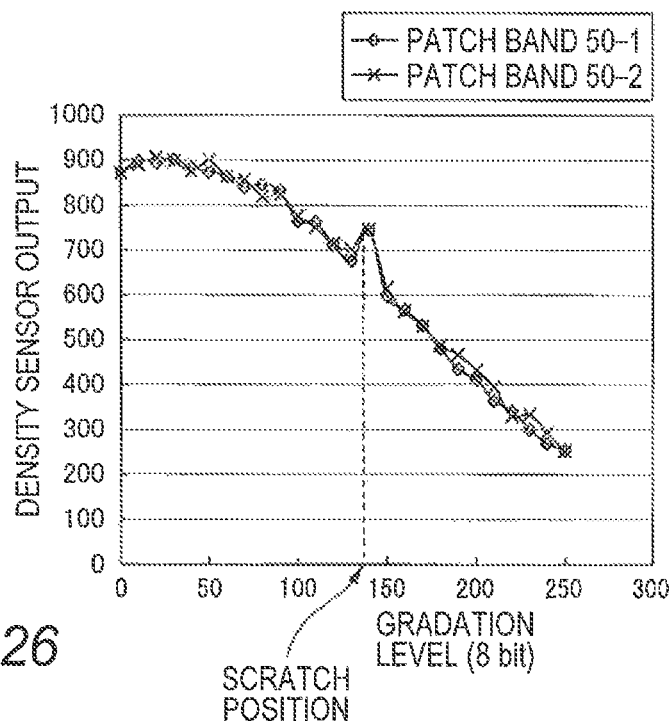
FIG. 26 shows output values from a density detection sensor that are provided in a configuration of related art.

As example comparison with the present embodiment, FIG. 26 shows output values from density detection sensor 43 used in the configuration shown in FIG. 2. Since a scratch is present in patches having the same gradation in patch bands 50-1 and 50-2, a correct detected density of the gradation patch where the scratch is present cannot be acquired from neither of patch bands 50-1 and 50-2.

In the examples described above, patch bands 50-1 and 50-2, each of which is formed of eleven gradation patches P1 to P11 having different gradation levels, are used as patch bands for density detection, but the number of gradation patches that form a patch band is not limited to eleven.

The number of patch bands 50 to be formed is not limited to two and may alternatively be three or more. Essentially, a plurality of patch bands may be formed so as to at least partially overlap with each other in the main scanning direction of the patch bands and have at least some of the gradations different from each other between the patch bands in the overlap portion.

The above-described examples have been described with reference to image forming apparatus 5 in which intermediate transfer belt 421 is the image bearing member, but the present invention is also applicable in the similar manner, to an image forming apparatus in which a belt-shaped photoconductor, a drum-shaped photoconductor, or an intermediate transfer drum is the image bearing member.

Embodiments of the present invention have been described above. The above description is presented by way of example of preferred embodiments of the present invention, and the scope of the present invention is not limited thereto. That is, the description of the configuration and operation of the apparatus described above is presented by way of example, and it is apparent that a variety of changes and additions can be made to the embodiments within the scope of the present invention.

What is claimed is:

1. An image forming apparatus comprising:
   an image forming section that forms a plurality of patch bands at a plurality of positions in a main scanning direction on an image bearing member. each of the plurality of patch bands having a plurality of gradation patches disposed in a sub-scanning direction;
   a density detection section that detects densities of the plurality of patch bands; and
   a control section that performs gradation correction based on detection results from the density detection section, wherein
   the plurality of patch bands differ from each other and are formed of a first patch band formed of etches having densities that change stepwise and a second patch band having gradation levels different from those of the first patch band, and
   the control section corrects detection results on the first patch band based on detection results on the second etch band and calculates output gradation levels.

2. The image forming apparatus according to claim 1, wherein the gradation patches that form the plurality of patch bands are disposed differently from each other.

3. The image forming apparatus according to claim 1, wherein each of the gradation patches that form the second patch band is a reference patch in which a toner image having the maximum density is formed.

4. The image forming apparatus according to claim 1, wherein each of the gradation patches that form the second patch band is a surface region of the image bearing member where no toner image is formed.

5. The image forming apparatus according to claim 1, wherein each of the gradation patches that form the second patch band has a region where a toner image having the maximum density is formed and a surface region of the image bearing member where no toner image is formed.

6. The image forming apparatus according to claim 1, wherein the control section determines whether or not unevenness has occurred in the sub-scanning direction of the image bearing member based on detected densities of the second patch band and calculates an output gradation level of each of the gradation patches of the first patch band based on detected densities of the first patch band and the detected densities of the second patch band when it is determined that unevenness has occurred.

7. The image forming apparatus according to claim 1, wherein the density detection section detects densities of the first patch band and densities of the second patch band at the same time.

8. The image forming apparatus according to claim 1, wherein the first patch band and the second patch band are located in non-image forming regions at both ends of the image bearing member in the main scanning direction thereof.

9. An image forming apparatus comprising:
   an image forming section that forms a plurality of patch bands at a plurality of positions in a main scanning direction on an image bearing member, each of the plurality of patch bands having a plurality of gradation patches disposed in a sub-scanning direction;

a density detection section that detects densities of the plurality of patch bands; and a control section that performs gradation correction based on detection results from the density detection section, wherein the plurality of patch bands differ from each other, and have gradation patches that at least partially overlap with each other in the main scanning direction, and at least some of the gradation levels differ from each other between the plurality of gradation patches in the overlap portion.

10. The image forming apparatus according to claim 9, wherein each of the patch bands is formed of a plurality of gradation patches having different gradation levels, and the gradation patches are so disposed that the gradation levels thereof run in the sub-scanning direction.

11. The image forming apparatus according to claim 9, wherein the plurality of patch bands include a first patch band and a second patch band disposed in parallel to each other in the sub-scanning direction, the first patch band is formed of gradation patches having gradation levels that gradually increase or decrease, and the second patch band is formed of the gradation patches produced by interchanging the former half and the latter half of the gradation patches separated at a substantially central position of the first patch band.

12. The image forming apparatus according to claim 9, wherein the plurality of patch bands include a first patch band and a second patch band disposed in parallel to each other in the sub-scanning direction, the first patch band is formed of gradation patches having gradation levels that gradually increase or decrease, and the second patch band is formed of gradation patches having gradation levels gradually decrease or increase conversely to the first patch band.

13. The image forming apparatus according to claim 9, wherein the plurality of patch bands include a first patch band and a second patch band having gradation patches disposed in the same manner, and the first patch band and the second patch band are shifted from each other in the sub-scanning direction so as to partially overlap with each other in the sub-scanning direction.

14. The image forming apparatus according to claim 9, wherein when a detected density of a first gradation patch contained in the first patch band and a detected density of a second gradation patch contained in the second patch band and having the same gradation level as the gradation level of the first gradation patch have a difference greater than or equal to a threshold, a detected density of a gradation patch having a greater difference from the average of the detected densities of gradation patches on both sides of the gradation patch is handled as invalid data, between the detected density of the first gradation patch and the detected density of the second gradation patch.

15. The image forming apparatus according to claim 14, wherein the image forming apparatus also handles as invalid data the detected density of a gradation patch disposed at a position of coinciding with the gradation patch handled as invalid data in a direction perpendicular to the sub-scanning direction.

16. The image forming apparatus according to claim 14, wherein when a gradation patch disposed at a position of coinciding with the gradation patch handled as invalid data in a direction perpendicular to the sub-scanning direction has a lower density than a predetermined density, the detected density of the thus disposed gradation patch is also handled as invalid data.

17. A gradation correction method for an image forming apparatus, the method comprising:

a first step of forming a plurality of patch bands by using an image forming section, the plurality of patch bands being disposed at a plurality of positions in a main scanning direction on an image bearing member, each of the plurality of patch hands having a plurality of gradation patches disposed in a sub-scanning direction;

a second step of detecting densities of the plurality of patch bands by using a density detection section; and a third step of performing gradation correction by using a control section, based on detection results from the density detection section, wherein the plurality of patch bands differ from each other and at least partially overlap with each other in the main scanning direction, and at least some of the gradation levels differ from each other between the plurality of gradation patches in the overlap portion.

18. The gradation correction method according to claim 17, wherein the gradation patches that form the plurality of patch bands are disposed differently from each other.

* * * * *